US006427170B1

United States Patent
Sitaraman et al.

(10) Patent No.: US 6,427,170 B1
(45) Date of Patent: Jul. 30, 2002

(54) INTEGRATED IP ADDRESS MANAGEMENT

(75) Inventors: Aravind Sitaraman, Santa Clara; Maria Alice Dos Santos, Redwood City; Shuxian Lou, San Jose; Shujin Zhang, San Mateo; Sampath Kumar Sthothra Bhasham, Santa Clara, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/208,608

(22) Filed: Dec. 8, 1998

(51) Int. Cl.[7] .............................................. G06F 15/173
(52) U.S. Cl. ...................................... 709/226; 709/228
(58) Field of Search ................................ 709/224, 223, 709/225, 226, 219, 229, 228, 227

(56) References Cited

U.S. PATENT DOCUMENTS

| | | | |
|---|---|---|---|
| 5,241,594 A | 8/1993 | Kung ........................... 713/151 |
| 5,430,715 A | 7/1995 | Corbalis et al. ............. 370/392 |
| 5,621,721 A | 4/1997 | Vatuone ....................... 370/394 |
| 5,655,077 A | 8/1997 | Jones et al. ................. 713/201 |
| 5,684,950 A | 11/1997 | Dare et al. ................... 713/201 |
| 5,699,521 A | 12/1997 | Iizuka et al. ................ 709/240 |
| 5,734,654 A | 3/1998 | Shirai et al. ................ 370/396 |
| 5,793,763 A | 8/1998 | Mayes et al. ................ 370/389 |
| 5,835,720 A | 11/1998 | Nelson et al. .............. 709/224 |
| 5,835,725 A | 11/1998 | Chiang et al. .............. 709/225 |
| 5,838,994 A | 11/1998 | Valizadeh ..................... 710/56 |
| 5,845,070 A | 12/1998 | Ikudome ...................... 713/201 |
| 5,854,901 A | 12/1998 | Cole et al. ................... 709/245 |
| 5,898,780 A | 4/1999 | Liu et al. ..................... 713/155 |
| 5,918,016 A | 6/1999 | Brewer et al. ............... 709/220 |
| 5,926,458 A | 7/1999 | Yin ............................. 370/230 |
| 5,944,824 A | 8/1999 | He ............................... 713/201 |
| 5,968,116 A | 10/1999 | Day, II et al. ............... 709/202 |
| 5,970,477 A | * 10/1999 | Roden ..................... 709/229 X |
| 5,974,453 A | 10/1999 | Anderson et al. ........... 709/220 |
| 5,991,828 A | 11/1999 | Horie et al. .................... 710/8 |
| 6,009,103 A | 12/1999 | Woundy ...................... 370/401 |
| 6,012,088 A | * 1/2000 | Li et al. ...................... 709/219 |
| 6,021,429 A | 2/2000 | Danknick ..................... 709/208 |
| 6,026,441 A | 2/2000 | Ronen ......................... 709/227 |
| 6,055,236 A | 4/2000 | Nesssett et al. ............. 370/389 |
| 6,091,951 A | 7/2000 | Sturniolo et al. ........... 455/432 |
| 6,092,178 A | 7/2000 | Jindal et al. .................. 712/27 |
| 6,092,196 A | 7/2000 | Reiche ........................ 713/200 |
| 6,119,160 A | 9/2000 | Zhang et al. ................ 709/224 |
| 6,141,687 A | 10/2000 | Blair ........................... 709/225 |
| 6,154,776 A | * 11/2000 | Martin ........................ 709/226 |

OTHER PUBLICATIONS

Carrel, D. et al., The TACACS+ Protocol, Version 1.78, Cisco Systems, Inc., printed from *ftp://ftp-eng.cisco.com/edweber/tac-rfc.1.78.txt* on Oct. 23, 2000.

(List continued on next page.)

*Primary Examiner*—Patrice Winder
(74) *Attorney, Agent, or Firm*—Thelen Reid & Priest LLP; David B. Ritchie

(57) ABSTRACT

A method and apparatus for managing dynamic IP address allocation in a data communications network having a point of presence, a network access device associated with said point of presence, and user connections to users formed through the network access device. The system includes a protocol gateway in communication with the network access device, an authentication, authorization and accounting (AAA) server in communication with the protocol gateway, a dynamic IP allocation server in communication with the protocol gateway, a local memory in communication with the protocol gateway; and a local memory publisher, which periodically publishes the contents of the local memory over an information bus so that the contents may be received by subscribing entities.

145 Claims, 10 Drawing Sheets

OTHER PUBLICATIONS

Alexander, S., "DHCP Options and BOOTP Vendor Extensions," Network Working Group, RFC 1533. Oct. 1993.

Cisco Systems, Inc., "CiscoDNS/DHCP Manager V.1.1", printed from http://www.combinet.com/warp/public/751/dnsmg/dnsmg_ds.htm, on Sep. 10, 1998, 4 pages.

Cisco Systems, Inc., "Cisco DNS/DHCP Manager V.1.1.", printed from http://www.combinet.com/warp/public/751/dnsmg/dnsmg_pa.htm, on Sep. 10, 1998, 7 pages.

Droms, R., "Dynamic Host Configuration Protocol, " Network Working Group, RFC 1531, Oct. 1993.

Network Registrar, "Regain Confidence and Control Over Your IP Address Infrastructure", American Internet Corporation, Bedford, MA.

Network Registrar, "Hot Products & Solutions —IP Address Management: A White Paper", American Internet Corporation, Bedford, MA, printed from http://www.american.com/ip-mgmt.html, on Jul. 24, 1998.

"Network Address Translation Information", printed from http://www.uq.edu.au/~gadmacka/content/natinformation.htm, on Sep. 19, 1998.

"Three Ways to Manage IP Addresses", PC Magazine: IP Address Management, printed from http://www.zdnet.com/pcmag/features/ipmanage/ip-s2.htm, on Sep. 10, 1998.

* cited by examiner

INTEGRATED IP ADDRESS MANAGEMENT

BACKGROUND OF THE INVENTION

1. Field of the Invention

The present invention relates to management of data communications networks. More particularly, the present invention relates to an IP (Internet Protocol) address management system and method for managing IP addresses on a data communications network utilizing dynamic IP address assignment.

2. The Background

Data communications networks are widespread and there are many different types of networks, including LANs (Local Area Networks), MANs (Metropolitan Area Networks), and WANs (Wide Area Networks). They are used for providing numerous services, both for companies and for individuals. They provide a powerful communication mechanism and allow access to various kinds of remote information. Two or more networks connected together form an internetwork (or internet). The "Internet" is a worldwide internet widely used to connect universities, government offices, companies, and private individuals. Every host (or end-user's machine running user applications) and router interface on the Internet has an IP address, which encodes its network number and host number. The combination is unique and no two machines have the same IP address. IP addresses are typically 32 bits long and are used in the source address and destination address fields of IP packets. The Source Address is the ultimate source of the IP packet; the Destination Address is the ultimate destination of the IP packet.

FIG. 1 illustrates IP address formats well known to those of ordinary skill in the art. The IP address formats are divided into five classes. The class A format, which begins with a "0" bit for indicating the class and has a 7-bit network address field and a 24-bit host address field, allows up to 126 networks with 16 million hosts each. The class B format beginning with the bit pattern "10" allows 16382 networks with up to 64K hosts each. The class C format beginning with the bit pattern "110" allows 2 million networks (e.g., LANS) with up to 254 hosts each. The class D format beginning with "1110" is for multicast in which a packet is directed to multiple hosts. Finally, the Class E format beginning with the bit pattern "11110" is reserved for future use. Network numbers are assigned by the InterNIC (Internet Network Information Center) or another administrative body in order to avoid conflicts.

These binary IP addresses are, however, rarely used by computer programs and humans to refer to hosts, mailboxes (for email), and other resources. Instead of binary numbers, ASCII strings, such as "company.com" are used. In order to avoid host name conflicts, these names are managed by the Domain Name System (DNS) (central to a domain), the Internet's official naming system. The DNS provides a hierarchical, domain-based naming scheme and a distributed database system for implementing this naming scheme. That is, conceptually, the Internet is divided into several hundred top-level domains, where each domain covers many hosts. Each domain is partitioned into subdomains, which are further partitioned, and so on.

In the hierarchical scheme, each domain controls how it allocates its subdomains (i.e., the domains under it). To create a new domain, permission is required of the domain in which it will be included. Once a new domain has been created and registered, it can create subdomains without permission from any higher domain, and keep track of all of its own subdomains. The DNS is primarily used for mapping host names to IP addresses, but it can be used for other purposes.

Every domain, whether it represents a single host or is a top-level domain, can have a set of resource records associated with it. A resource record is, for example, a five-tuple including the fields of Domain_name, Time_to_live, Class, Type, and Value. The Domain_name field tells the domain to which the record applied, and thus the primary search key used to satisfy queries. When a query is made about a domain, all the matching records of the class requested are returned by the DNS. The Time_to_live field gives an indication of how stable the record is. Information that is highly stable is assigned a large value, such as 86400 (the number of seconds in one day). Information that is highly volatile is assigned a small value, such as 60 (one minute). For Internet information, the Class field is always "IN". The Type field tells what kind of record this is. The important types are, for example, SOA (Start of Authority), A (Address), MX (Mail exchange), NS (Name Server), PTR (Pointer), HINFO (Host information), TXT (Text), and the like. Finally, the Value field provides an actual value for the record. For example, an SOA record provides the name of the primary source of information about the name server's zone (described below), and its value is parameters of this zone. The most important record type is the A (Address) record. It holds a 32-bit IP address for a certain host. Every Internet host must have at least one IP address, so that other machines can communicate with it. Some hosts have two or more network connections (through different interfaces), in which case they will have one type A resource record (e.g., IP address) per network connection.

The naming scheme of the DNS is implemented as a corresponding hierarchical database system. The DNS name space is divided up into non-overlapping zones. Each zone contains name servers holding the authoritative information about the zone. Normally, a zone has one primary name server and one or more secondary name servers. The primary server gets its information from a file on its disk, and secondary servers get their information from the primary name server.

To obtain resource records for a domain name, for example, to get the IP address for a host name, an application program calls a library procedure called the resolver, passing it the domain name as a parameter. The resolver sends a UDP (User Datagram Protocol) packet to one of the local name servers. For example, to map a host name onto an IP address, a resolver can send a query about the host name to a local name server. If the local name server has resource records for the domain (that is, the local name server has jurisdiction over the host name being sought), it returns the authoritative resource records. The "authoritative" record is one that comes from the authority that manages the record and thus is always correct.

If, however, the domain is remote and no information about the requested domain is available locally, the name server sends a query message to the top-level name server for the domain requested. For example, when a user (DNS client) in San Francisco (SF) makes a query about John.rd.company.com for a local name server in SF, which does not have records for the host, the SF name server sends a UDP packet to the server for corn given in its database, com-server.net. It is unlikely that the com-server.net knows John.rd.company.com or rd.company.com, but it definitely knows company.com that is one of its own subdomains. Thus, com-server.net forwards the inquiry to company.com. In turn, company.com forwards the request to rd.company.com, which must have the authoritative resource records. The resource records requested are sent backward from rd.company.com to the SF name server.

Once these records get back to the SF name server, they will be entered into a cache there (local cache), in case they are needed later. However, this information is not authoritative, since changes made at rd.company.com will not be propagated to all the caches of local name servers that may know about it. For this reason, entries in a local cache should not live too long (i.e., the Time__to__live field is set to a small value).

The above query method is recursive, since each server that does not have the requested information goes and finds it somewhere, then reports back. Alternatively, when one local name server fails to find the desired records, it may return the name of the next local name server along the line to try. For example, SF name server may give the name of the San Jose name server when it cannot find a resource record for John.rd.company.com. This gives a DNS client more control over the search process.

The growth of the Internet appears to be exponential. Tens of thousands of networks are now connected to the Internet, and the number is close to doubling every year. Unfortunately, however, IP addresses are not infinite and it is rather expensive to procure more IP addresses. With the increase in the number of users of the Internet, Telcos (Telecommunication companies) and ISPs (Internet Service Providers) are faced with an increasing shortage of IP addresses.

The Dynamic Host Configuration Protocol (DHCP) has been developed to provide an automated assignment of IP addresses and to help solve the shortage of IP addresses. Conventional DHCP operation is as follows: When a DHCP client computer attempts an Internet connection, it broadcasts a DHCP request asking for any DHCP server on the network to provide it with an IP address and configuration parameters. A DHCP server on the network that is authorized to configure this client will offer an IP address by sending a reply to the client. Upon receiving this offer, the client may decide to accept it or wait for additional offers from other DHCP servers on the network. At the end, the client chooses and accepts one offer, and the chosen DHCP server sends an acknowledgement with the offered IP address having an associated "lease" time (and any other configuration parameters the client might have requested). During the lifetime of the lease, the client will repeatedly ask the server to renew. If the client chooses not to renew or if the client machine is shut down, the lease eventually expires. Once the lease expires, the IP address can be "recycled" and given to another machine.

The same IP address may not be issued to more than one user on the network. DHCP servers commonly verify addresses by using a "ping" service to determine that an IP address is not already in use. The ping utility broadcasts packets with a specific IP destination address. If there is a computer using that IP address on the network, it sends back a reply. However, this ping utility only works effectively in a small system such as a LAN and when all users on the network are running their computers. Also, depending upon the network load, routers are not obliged to respond to pings, hence ping is an unreliable mechanism. Ping is governed by the KMP protocol known to those of ordinary skill in the art.

Currently, the only solution for Telcos and ISPs to manage the shortage of IP addresses is to configure a Network Access Server (NAS) in each PoP (point of presence) so as to implement DHCP-like functionality with IP address pools so as to dynamically allocate IP addresses. That is, the NAS hands out IP addresses to users (end-users of the Telco or ISP) when the users log-in, and revokes them when the users log-out, making those IP addresses available to other users. Such mechanisms make it impossible to reliably (a) locate users by name; and (b) account for usage. A distributed DHCP server, for example, in a PoP, leases IP addresses from its IP address pool to be assigned to hosts on a temporary basis. This mechanism is more "granular" and addresses the problems stated above. These "dynamic" IP addresses are compared with "static" IP addresses that are practically permanently allocated and recorded, typically, in DNS servers.

A DHCP server may maintain the lease information of IP addresses allocated to users. However, when a user logs-out, the IP address and the user name are removed from that lease information. Therefore, a user (or one machine) may be assigned more than one IP address on any given day. In cases where the address is managed by a NAS, the allocated address is not dynamically recorded in the DNS. In cases where a DHCP server hands out the IP address, the IP address record in the DNS may be dynamically updated. Such information on dynamic IP addresses is locally handled by respective DNS servers, for example, in respective PoPs, and is always changing. Therefore, when a dynamic IP address is handed to a user at a local NAS in a PoP, Telcos and ISPs, as well as any other NAS and peer users, have no way to reliably identify or account for network usage of the user (usually known by a fully-qualified domain name).

Some systems handle dynamic updates of IP addresses in DNS servers, in which DHCP servers automatically send IP address lease information to DNS servers. However, these "Dynamic DNS" solutions are not scaleable for dealing with multiple DHCP servers spread across multiple PoPs. Because DHCP servers are currently all centralized servers, all IP requests and updates from the physically distributed users are back-hauled to the centralized DHCP server. Hence, apart from handling the IP address allocations, the DHCP servers also have to deal with updating the DNS server for every transaction.

Thus, a primary DNS server has no way to reliably identify users by their fully qualified domain names or IP addresses if the IP addresses are handed out by the NAS. This inability to identify users by their respective fully-qualified domain names or IP addresses is constantly being exacerbated because of (a) the increasing demand for network access; (b) the desire to use private IP addresses; and (c) the requirements of mobile or roaming users.

Accordingly, there is a need for a much more scaleable and distributed solution for managing dynamic IP addresses. Further, it is required that any solution use open and well-understood standards.

BRIEF DESCRIPTION OF THE INVENTION

A method and apparatus for managing dynamic IP address allocation in a data communications network having a point of presence, a network access device associated with said point of presence, and user connections to users formed through the network access device. The system includes a protocol gateway in communication with the network access device, an authentication, authorization and accounting (AAA) server in communication with the protocol gateway, a dynamic IP allocation server in communication with the protocol gateway, a local memory in communication with the protocol gateway; and a local memory publisher, which periodically publishes the contents of the local memory over an information bus so that the contents may be received by subscribing entities.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled person after a perusal of this specification.

In the following description, a preferred embodiment of the invention is described with regard to preferred process steps and data structures. However, those skilled in the art will recognize, after perusal of this application, that embodiments of the invention may be implemented using at least one general purpose computer operating under program control, and that modification of the general purpose computer to implement the components, process steps, and/or data structures described herein would not require undue invention.

In accordance with a presently preferred embodiment of the present invention, the components, process steps, and/or data structures are implemented using C++ programs running on an Enterprise 2000 server™ running SunSolaris™ as its operating system. The Enterprise 2000 server™ and SunSolaris™ operating system are available from Sun MicroSystems, Inc. of Mountain View, Calif. This implementation is not intended to be limited in any way. Different implementations may be used and may include other types of operating systems, computing platforms, and/or computer programs. In addition, those of ordinary skill in the art will readily recognize that devices of a less general purpose nature, such as hardwired devices or devices relying on FPGA or ASIC technology, may also be used without departing from the scope and spirit of the inventive concepts disclosed herewith.

Figure 2:
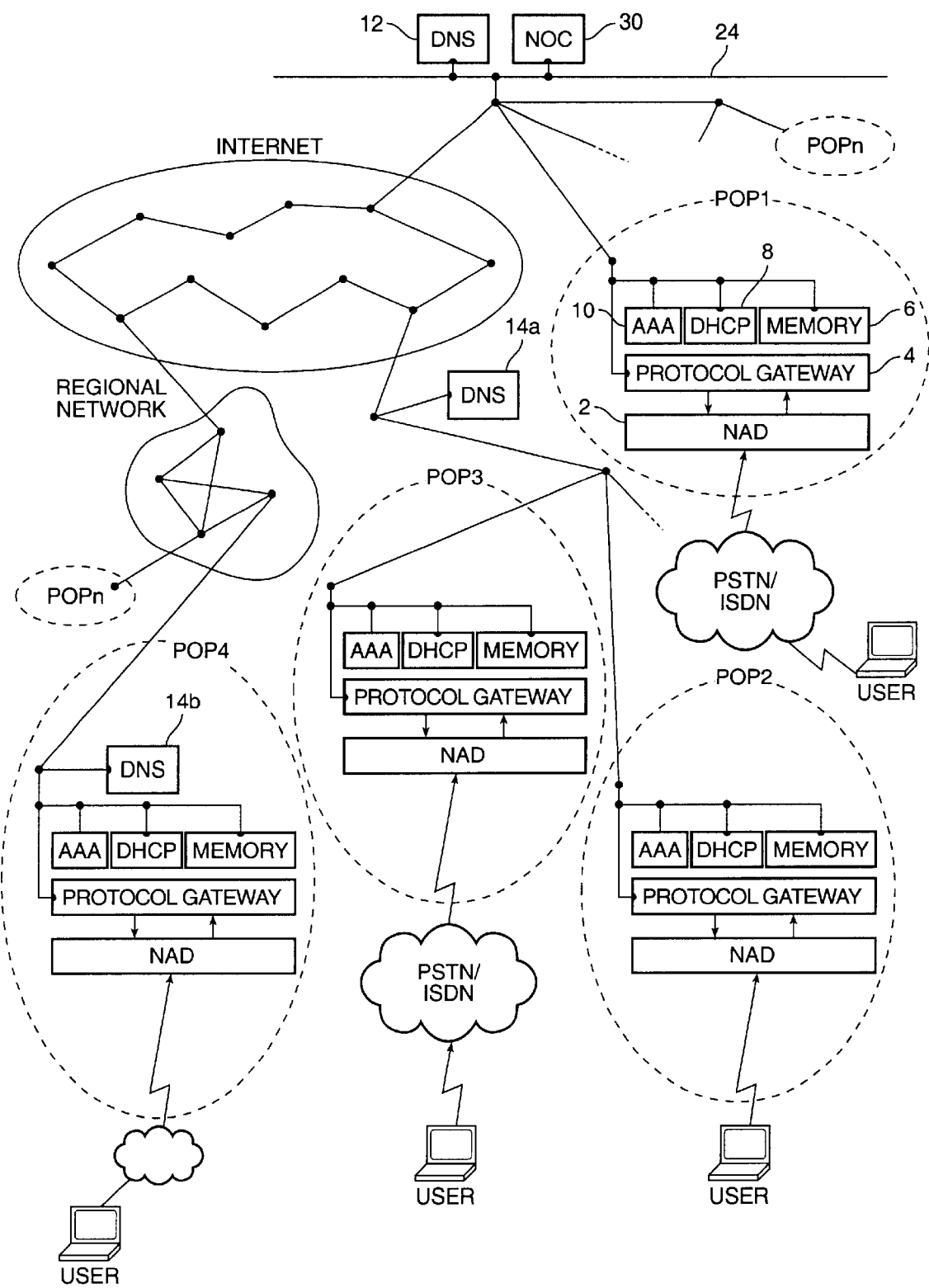
FIG. 2 is a schematic diagram illustrating an IP address management system on a data communications network according to a presently preferred embodiment of the present invention.

FIG. 2 schematically illustrates an IP address management system on a data communications network according to one embodiment of the present invention. In this specification, the term "data communications network" is used in a broad meaning including regional networks and the Internet or other networks, as shown in FIG. 2. The IP address management system in accordance with one presently preferred embodiment of this invention includes a network access device (NAD) 2 in a point of presence (PoP) for providing user access to the data communications network, a gateway device 4 coupled to the network access device 2, a gateway memory 6 associated with the gateway device 4, a dynamic IP address service 8 coupled to the gateway device 4 and to the data communications network, and an authentication, authorization and accounting (AAA) service 10 coupled to the protocol gateway 4 and to the data communications network. The Domain Name System (DNS) on the network is illustrated with its hierarchical structure having a primary (top-level) DNS server 12, a secondary (lower-level) DNS server 14a, and a local DNS server 14b.

A protocol gateway is a device which performs protocol conversion between different types of networks or applications. The term gateway is not meant to be limited to a single type of device, as any device, hardware or software, that may act as a bridge between the user and the networks may be considered a gateway for purposes of this application.

The network access device 2 may be a conventional Network Access Server (NAS) for the dial-up platform, the "Vega" product for the xDSL platform (available from Cisco Systems, Inc. of San Jose, Calif.), "Gatekeeper" product for the Voice Over Internet Protocol (also available from Cisco Systems, Inc.), or the like. The user may reach the network access device 2 in a PoP via a PSTN (Public Switched Telephone Network) or ISDN (Integrated Services Digital Network), or in another conventional manner. The protocol gateway 4 is a product, device, or collection of devices and software products that can host a variety of industry-standard protocols such as RADIUS (Remote Authentication Dial-In User Service), DHCP (Dynamic Host Configuration Protocol), TACACS+ (Terminal Access Concentrator Access Control Server PLUS), SNMP (Simple Network Management Protocol), and the like. The protocol gateway 4 is preferably implemented using a computer (gateway server). The local cache memory 6 is preferably a cache memory which may be distributed and/or part of the protocol gateway 4. The dynamic IP address server 8 maintains a pool 22 of IP addresses and leases the IP addresses of the pool 22. In accordance with a preferred embodiment, the dynamic IP address server 8 is a DHCP server. The dynamic IP address server 8 may be implemented in the same machine as that of the protocol gateway 4, or may be a different server coupled to the machine. The dynamic IP address server 8 may adapt a protocol other than the standard DHCP so long as necessary IP address lease functions are provided. The AAA service 10 provides user authentication, authorization and accounting information to the protocol gateway 4. The AAA service 10 is implemented in a computer, preferably the same machine or server as that of the protocol gateway 4, using any necessary communication means such as RADIUS, TACACS+, or the like to access and retrieve user profiles or user identification information stored, typically, in caches (in-memory databases). An AAA service may be provided, for example, using any authentication, authorization and accounting (AAA) server, such as Cisco ACS or Cisco Secure, both available from Cisco Systems, Inc. of San Jose, Calif.

Figure 3:
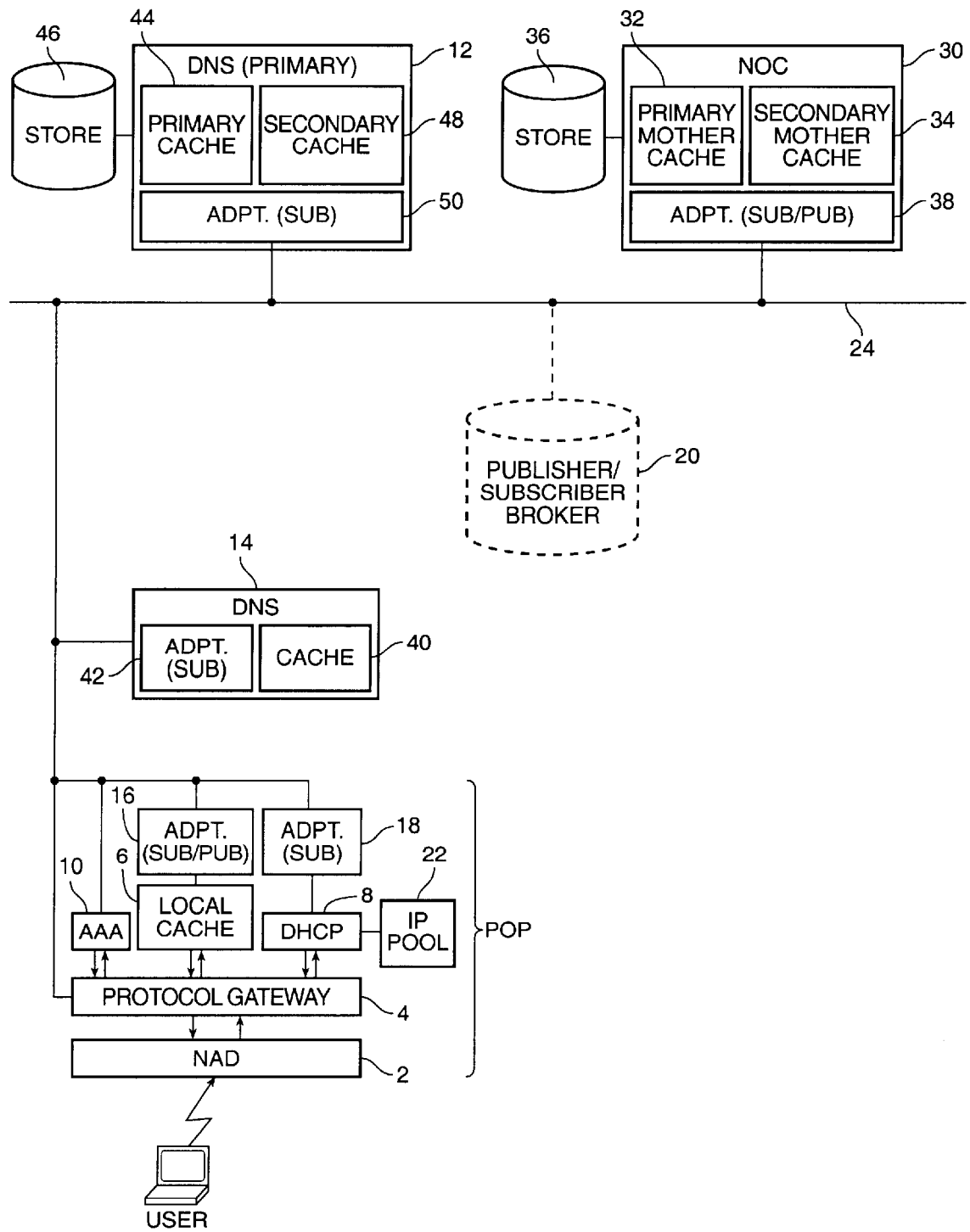
FIG. 3 is a schematic diagram illustrating an exemplary architecture of the IP address management system according to a presently preferred embodiment of the present invention.

FIG. 3 schematically illustrates an exemplary architecture of the IP address management system according to a presently preferred embodiment of the present invention. The IP address management system further includes a database adapter 16 for periodically publishing the contents of the local cache 6. The present invention uses a publisher-subscriber system for transferring data. In accordance with one presently preferred embodiment, the IP management system uses a publisher-subscriber system including a CORBA-based information broker, such as ActiveWeb from Active Software Inc. of Santa Clara, Calif., so as to deliver or transmit events published by a publisher to one or more subscribers.

The publisher-subscriber system typically includes adapters and brokers. Adapters integrate information resources such as databases, applications, and the like, into the publisher-subscriber system, enabling the information resources to work with events. An "Event" is a unit of information (or message) exchanged between publisher and subscriber. Events are exchanged over any appropriate data communications link such as an internet and the Internet. Each event is categorized or typed, to distinguish one event from others, and is self-describing. Thus, each event can be filtered by its contents. To send an event, an information resource publishes the event. To receive events of a particular type, an information resource subscribes to that type of event. A broker mediates the delivery of events among publishers and subscribers, and serves as a central point for administration. Brokers are the hubs through which all events flow. In FIG. 3, one broker 20 is shown.

The protocol gateway 4 creates an event (data to be transmitted) and then invokes the publishing operation of the database adapter 16. The protocol gateway 4 controls the database adapter 16 so as to periodically publish specific type of events (described later). Publishing an event is the act of transmitting the event to the broker 20. The broker 20 delivers to subscriber(s) of this type of events. A publisher does not have to send (or "multicast")the events to all subscribers. The broker 20 is "transparent" for the publishers and subscribers implementing adapters configured to send/receive certain type(s) of events.

When a user attempts to log-in to the data communications network through the network access device 2, the protocol gateway 4 queries the AAA service 10 in order to determine if the user is an authorized user and if an IP address is already allocated to the user. The AAA service 10 returns user authentication, authorization and accounting information of the user in response to the query of the protocol gateway device 4. The AAA service 10 returns an IP address to the protocol gateway 4 if the user is authorized to access the data communications network and an IP address is already allocated to said user. If the user is authorized to access the data communications network, but an IP address is not already allocated to the user, the dynamic IP address server 8 leases an available IP address of the IP address pool 22 to the protocol gateway 4. Then the protocol gateway 4 allocates the returned or leased IP address to the user, and maintains a database for IP address allocation events in the local cache 6. Then, the adapter 16 periodically publishes the IP address allocation events to an information bus 24. That is, the adapter 16 implements an interface for IP address information called as IP Address Information Interface (IPAII).

Each of the IP address allocation events includes an IP address allocated to a user and associated user identification information. According to a presently preferred embodiment of the invention, the IP address allocation event includes a user name, an IP address allocated to the user, the time at which the IP address was allocated (or the lease grant time), expiry time of the IP address (or the lease time), and a home PoP ID for the user. In addition, the IP address allocation event may include a session number for the IP address and other information.

When a user logs into and logs out of the data communications network using the allocated IP address, the network access device 2 reports the user's log-in and log-out to the protocol gateway 4. The protocol gateway 4 also maintains this information as a database for user accounting events in its own buffer memory internal to protocol gateway 4 until the adapter 16 periodically publishes these user accounting events. Thus, the adapter 16 also implements an interface for user accounting information called a User Accounting Interface (UAI). The user accounting events include at least users' log-on and log-off records. The user accounting events are preferably categorized into two types of events, namely, accounting start events each including a user name, an IP address, and the time at which the user logged in, and accounting stop events each including a user name, IP address, and time at which the user logged out. The user accounting events may include other user information.

In accordance with one presently preferred embodiment of the present invention, the adapter 16 may publish these events as lists or with lists, for example, a first list collecting the IP addresses allocation events, a second list collecting the accounting start events, and a third list collecting the accounting stop events.

In order to periodically publish the contents of its internal memory, the protocol gateway 4 may use a timer. For example, the IP address allocation events are periodically published based on a timer associated with the database for the IP address allocation events, or associated with the IP Address Information Interface implemented by the adapter 16. The periodicity and timing of the publication of the IP address allocation events and that of the user accounting events may be different. The publication cycle of the user accounting events may be longer than that of the IP address allocation events. However, in accordance with a presently preferred embodiment of this invention, in addition to this timer-based publication, the protocol gateway 4 requests the publication of the IP address allocation event of the adapter 16 each time before publishing the user accounting events. This prevents the log-in (and log-out) information of a user from being received by a subscriber before receiving the IP address allocation information of that user, making the published information reliable (that is, the subscriber always receives the information in a "proper" time order).

Each protocol gateway 4 operates within a single PoP and has a single PoP ID associated therewith. In accordance with a presently preferred embodiment of the present invention, IP address allocation events are published when a PoP ID received from the network access device 2 upon a user's attempted log-in is different from the home Pop ID contained in the user profile of that user.

This works as follows. When a user attempts to log-in to the data communications network, the network access device 2 sends user information entered by the user including a user name and a password in the form of an access request to the protocol gateway 4. In order to authorize the user, the protocol gateway 4 sends an authentication request to the AAA service 10. In response, if the user is authenticated, the AAA service 10 responds with an authentication packet which includes certain user identification information from the user profile maintained at the AM service 10. This information includes the home PoP ID of the user. If the PoP ID of the attempted log-in is different from home Pop ID of the user, the user is logging-in from some different PoP which would occur, for example, in the case of a roaming user. This publication realizes a timely update of IP address information for users moving from one PoP to another.

In accordance with a presently preferred embodiment of the invention, as shown in FIGS. 2 and 3, the IP address management system includes a network controller 30 located within a Network Operation Center (NOC) coupled to the protocol gateway 4 via the information bus 24, a primary mother cache memory 32 (backed up by a secondary mother cache memory 34) associated with the network controller 30, and a database adapter 38 associated with the network controller 30. The network controller 30 centrally manages IP addresses. The adapter 38, controlled by the network controller 30, periodically publishes the contents of the primary mother cache 32. The network controller 30, through the adapter 38, subscribes to the IP address allocation events and the user accounting events published from the local cache 6 in each PoP. The network controller 30 updates its records based on the subscribed events and produces a database for IP address revoke events that includes IP addresses to be revoked. The network controller 30 maintains the database for the IP address revoke events in the primary mother cache 32 until the adapter 38 publishes the IP address revoke events. Thus, the adapter 38 implements an interface for revoking IP addresses called an IP Management Interface (IPMI), as well as implementing IPAII and UAI for subscribing to the IP address allocation events and user accounting events.

The primary mother cache 32 is a memory storage device which centrally maintains databases for the network system. In order to backup the information stored in the primary mother cache 32, the secondary mother cache 34 obtains the information from the primary mother cache 32 and stores it, preferably in a separate machine. The secondary mother caches may be distributed in some locations in addition to one in the network controller 30, though this is not shown in FIG. 3.

Figures 1, 4, 5:
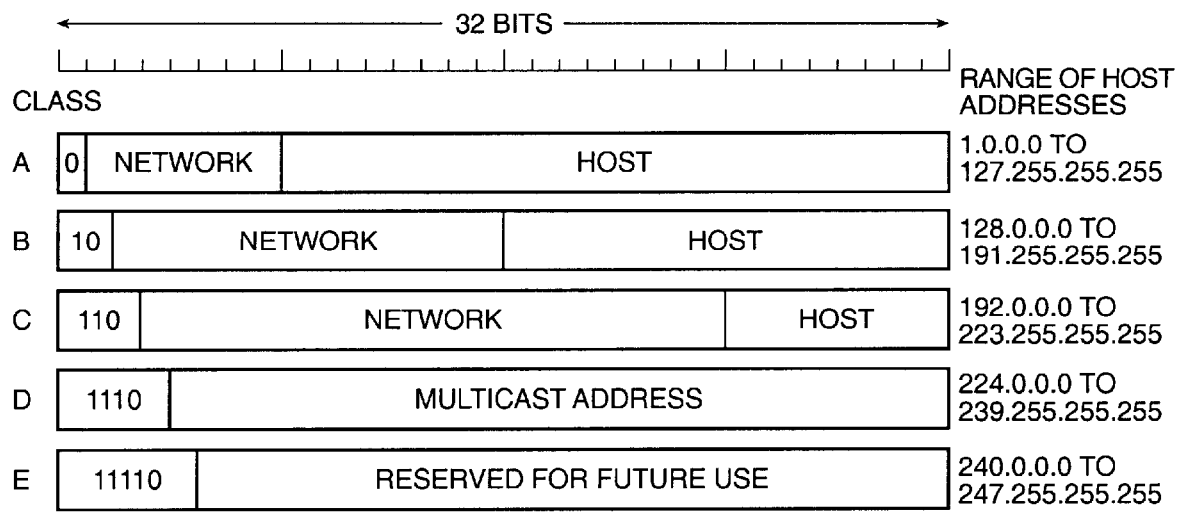
FIG. 1 is a diagram illustrating typical IP address formats having 32 bits.
FIG. 4 is a diagram showing an example of an IP address database in accordance with a presently preferred embodiment of the present invention.
FIG. 5 is a diagram showing an example of a user record database in accordance with a presently preferred embodiment of the present invention.

In accordance with a presently preferred embodiment of this invention, the primary mother cache 32 maintains an IP address database holding IP address information including IP addresses currently allocated to users (for example, an IP address table), and a user record database holding user identification information (for example, a user table, or user profile) for all PoPs covered by this IP address management system. In accordance with a presently preferred embodiment, the IP address information of the IP address database (IP Address Table) includes IP addresses currently allocated, user names to whom the IP addresses are allocated, and respective expiry time of the IP addresses, as shown in FIG. 4. The user identification information (User Table) includes user name, user's home PoP ID that defines which PoP the user normally belongs to, information on IP address allocation to the user, and other associated information and records, as shown in FIG. 5.

The local cache 6 in each PoP also maintains information on IP addresses allocated and user identification records for that PoP. In accordance with a presently preferred embodiment, the local cache 6 maintains an IP address database holding IP address information including IP addresses currently allocated to users (for example an IP address table for PoP), and a user record database holding user identification information for users having a home PoP ID of that PoP (for example, user profiles for PoP). The basic data held in the IP address database and the user record database in the local cache 6 is the same as that held in the primary mother cache 32. However, the local cache 6 only maintains information concerning users having that PoP as their home PoP and IP addresses included in the IP address pool 22 for that PoP, while the primary mother cache 32 maintains information concerning all users and IP addresses managed by this IP address managing system.

In a PoP, the local cache 6 subscribes, through the adapter 16, to the IP address allocation events published from peer PoPs and the IP address revoke events published by the network controller 30. In accordance with a presently preferred embodiment, the adapter 16 filters users' home PoP IDs on its own PoP ID, so that the local cache 6 at a PoP receives events for the users having a home PoP ID of that PoP. For example, an IP address allocation event of one local user having a home PoP ID of a PoP is received by the local cache 6 in that PoP and by the network controller 30.

When the local cache 6 receives the published events, it updates the IP address database and the user record database in the local cache 6. In accordance with a presently preferred embodiment, the local cache 6 receives the IP address allocation events and the IP address revoke events, and updates the contents of the IP address database (IP address table) and the user record database (user profile) based on the received events. For example, an entry is added to the IP address database when an IP address is reported by the IP address allocation event, and the entry is removed when the IP address is reported by the IP address revoke event. Fields in the user record database such as the IP address allocation field are checked and updated in accordance with the update/change in the IP address database. By checking and comparing the entry of the IP table and the corresponding IP address allocation field in the user table, errors, if any, in both tables are corrected and logged, in addition to updating the records in both tables.

The local cache 6 may further subscribe, through the adapter 16, to the accounting start events and update the contents of the IP address database based on the accounting start events. The local cache 6 may further subscribe to the accounting stop events, and further update the contents of the user record database based on the accounting start events and accounting stop events. For example, the expiry time of an IP address allocated will be replaced by the time the user logged out. However, it should be noted that the allocated IP addresses on the IP address database are revoked only when they are reported by the IP address revoke events published by the network controller 30, but not when reported by the accounting stop events published from the protocol gateway 4 in a PoP. This realizes that the IP address databases distributed among PoPs are centrally managed by the network controller 30.

In updating the IP address database, in accordance with a further preferred embodiment of the invention, the protocol gateway 4 may maintain a temporary database (or temporary table) for IP addresses allocated. The temporary database or table holds IP addresses that are reported by the IP address allocation events until the IP addresses are reported by the accounting start events. When an IP address on the temporary database is reported by the accounting start event, the protocol gateway 4 removes the IP address from the temporary database and adds it to the IP address database. In this implementation, the IP address is allocated to a user but the user's log-in is not yet confirmed (these IP addresses are referred to as "indeterminate" IP addresses). This is stored on the temporary database, and the IP address database contains only allocated IP addresses for which the users' log-in is confirmed.

The updating of information on IP addresses allocated and user identification records in the primary mother cache 32 in the network controller 30 is similar to that in the protocol gateway 4 described above. The network controller 30 updates the IP address database and user record database based on the IP address allocation events and the user accounting events subscribed. In a presently preferred embodiment implementing the primary mother cache 32, the disk memory 36 of the network controller 30 is updated according to the update of the primary mother cache 32. The secondary mother cache 34 is also updated in accordance with the update of the primary mother cache 32. The secondary mother cache 34 may subscribe to the published events from the primary mother cache 32 and the local cache 6 by implementing its adapter so as to update the contents.

The network controller 30 produces the database of IP address revoke events and publishes the IP address revoke events through the adapter 38. In accordance with one presently preferred embodiment, the database of IP address revoke events is produced based on a timer associated with the IP address database in the primary mother cache 32. The network controller 30 periodically examining the IP address database (IP address table) when the timer so indicates, and determines if IP addresses on the IP address table have expired.

In a further preferred embodiment of the invention, the network controller 30 may maintain in the primary mother cache 32 a temporary database for "indeterminate" IP addresses that are allocated but when the user's log-in is not yet confirmed. That is, the temporary database contains IP addresses that are reported by the IP address allocation events but not yet by the accounting start events. The IP address table contains IP addresses only after they are reported by the accounting start events. In this case, examining the expired IP addresses on the IP address table is significantly expedited. Picking up the expired IP addresses on the IP address database, the network controller 30 looks up the user record database and confirms that a user having the expired IP address logged out. If the user logged out, the network controller 30 removes the expired IP address from the IP address database and adds it to the database for IP address revoke events.

In accordance with another presently preferred embodiment of the invention, the network controller 30 may produce the database of IP address revoke events based on the accounting stop events subscribed. The network controller 30 verifies the expiry time of IP addresses on the IP address database when the IP addresses are reported by the accounting stop events. If the expiry time is verified, the network controller 30 removes the reported IP addresses from the IP address database, and adds it to the database for IP address revoke events.

In accordance with a presently preferred embodiment of the invention, the dynamic IP address server 8 is provided with a database adapter 18 so as to subscribe to at least the IP address revoke events published from the network controller 30. Thus, the database adapter 18 implements the interface for the user accounting information (User Accounting Interface:UAI). The dynamic IP address server 8 leases an IP address from its pool 22 when requested by the protocol gateway 4, and revokes the lease when the leased IP address is reported by the IP address revoke event so as to make the IP address available to another user. The dynamic IP address server 8 may maintain a database (or list) of available IP addresses.

In accordance with a presently preferred embodiment of this invention, the primary domain name system (DNS) server 12 and lower level DNS server(s) 14 subscribe to at least the accounting start events and the IP address revoke events, and update their information (i.e., association between users' domain names and IP addresses) based on the subscribed events. This is realized by providing the DNS servers with database adapters similar to that for the dynamic IP address server 8. As shown in FIG. 3, a lower level DNS server 14 may includes a memory 40 such as a cache memory and a database adapter 42 for subscribing the events. Similarly, the primary DNS server 12 may have a primary memory 44 such as a mother cache and a database adapter 50 for subscribing to the accounting start events and IP address revoke events. Thus, each one of the adapters 42 and 50 implements the User Accounting Interface and IP Management Interface, though, in accordance with one presently preferred embodiment, they do not have to subscribe to accounting stop events.

The primary DNS server 12 may include a disk memory 46 from which the primary cache 44 obtains the data, and a secondary cache memory 48 that obtains its information from the primary cache 44. In order to back-up the information, the secondary cache memory 48 is preferably implemented by a different machine from that of the primary cache memory 44. When an IP address is reported by the accounting start event, each one of the DNS servers 12 and 14 adds an entry of the association for the IP address if the IP address is not already on the records. If the IP address already exists on the record and is associated with a different domain name, the existing domain name is replaced with a newly reported name, logging the error. If the IP address exists and is associated with the same domain name as the reported name, the DNS server may ignore that record (the record remains unchanged).

Figure 6A:
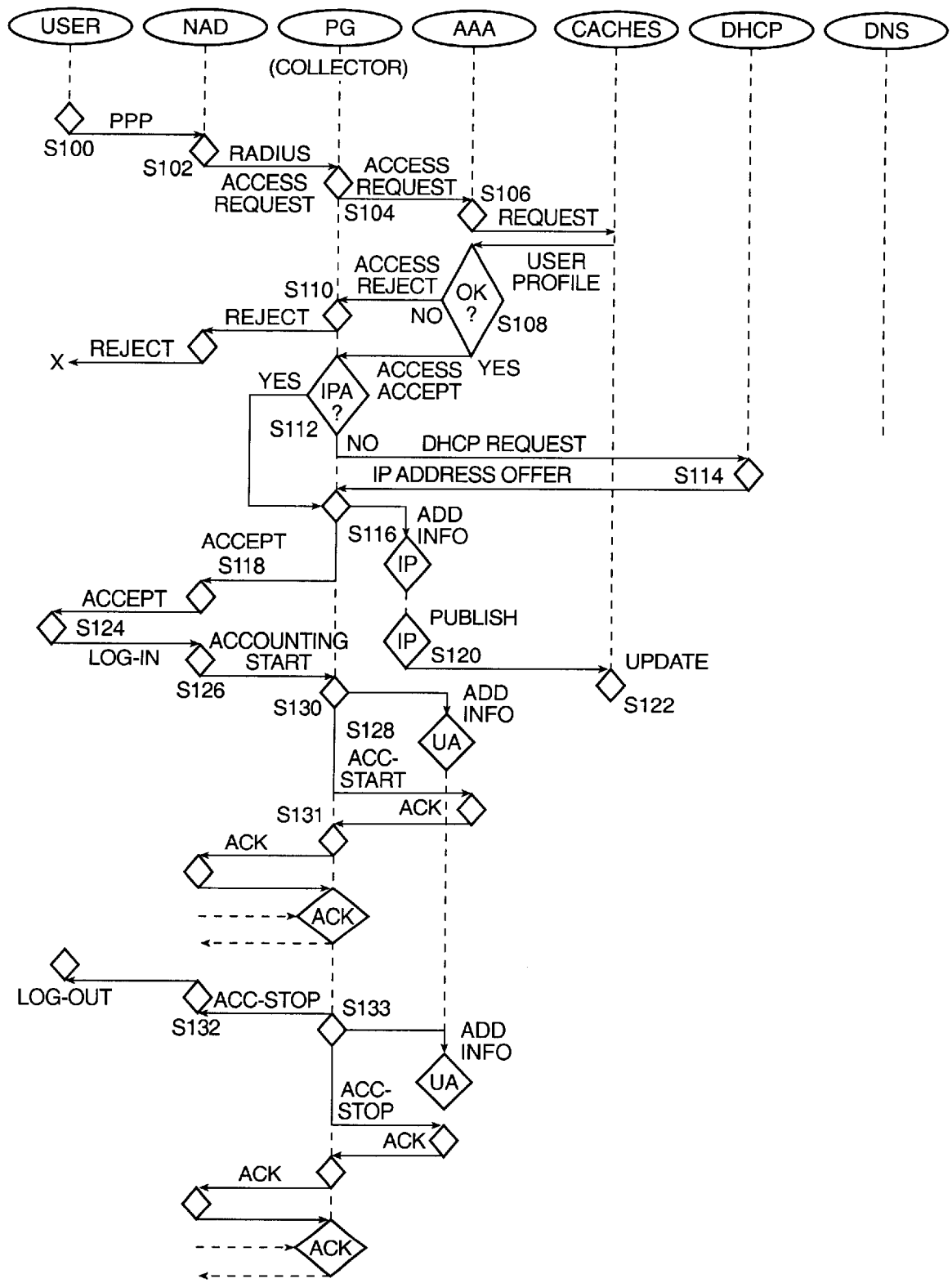
FIGS. 6A and 6B are process flow diagrams illustrating the data flow in the IP address management system in accordance with a presently preferred embodiment of the present invention when a user logs in and off the data communications network.
Figure 6B:
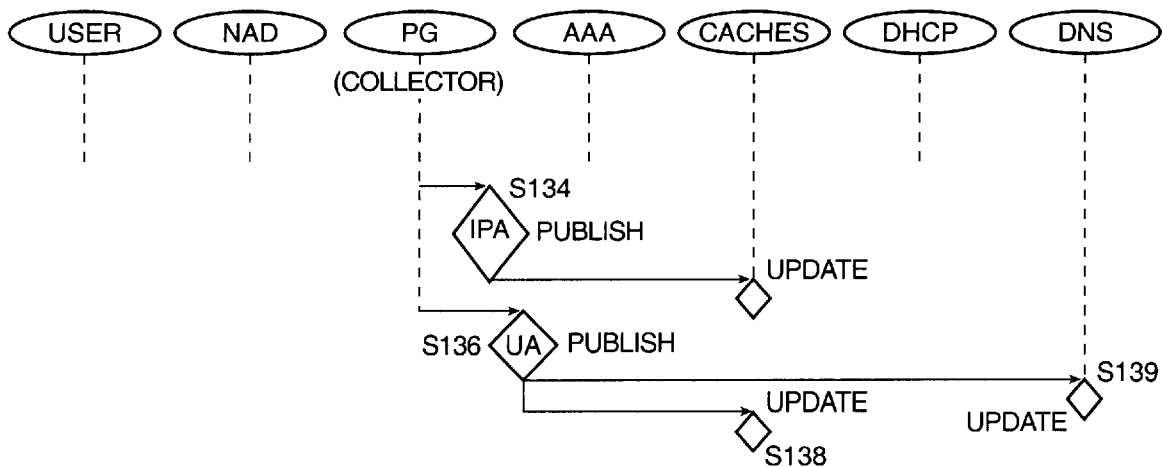

Next, the data flow and operation of the IP address management system in accordance with a presently preferred embodiment of the present invention is described. FIGS. 6A and 6B are diagrams illustrating the data flow in the system shown in FIGS. 2 and 3 when a user accesses the data communications network from a network access device 2 in a PoP. In the following description, the network access device 2 is referred to as a NAD. The protocol gateway includes operations of the protocol gateway 4 through the adapter 16. The local cache 6 and the primary mother cache 32 are both referred to as caches, unless otherwise specified. "Caches" also includes operations by the protocol gateway 4 and by the network controller 30 on the IP address databases and the user record databases maintained in the respective memories. For example, "caches update the records" means that the local cache 6 or the primary mother cache 32 updates the contents of the IP address database and/or the user record database. The Primary Mother Cache refers to the primary mother cache 32 and the corresponding operations thereon. In addition to the Primary Mother Cache, there may be some secondary mother caches at the network controller 30 and some distributed points such as main access points or routers. These mother caches maintain the information obtained from the Primary Mother Cache. The dynamic IP address server 8 is referred to as a DHCP server, including the IP address pool 22 and the operations of the adapter 18. The authentication, authorization and accounting service 10 is referred to as AAA service.

When a user logs-in on a NAD, attempting to access the data communications network, PPP (Point-to-Point Protocol) is initiated (S100). The NAD generates an access request and directs the request to the Gateway (S102). For example, in a presently preferred embodiment of the invention, a RADIUS Access-Request is generated and directed to the protocol gateway. However, other protocols can be used so long as the NAD and PG communicate. The protocol gateway directs the access request to an AAA service (S104). The AAA service then directs the request to multiple caches to retrieve the user's profile (S106). This query by the AAA service may be implemented using, for example, a Translation Service that load balances and sends packets to caches. The MA service may direct the request to a local cache 6 in the PoP, and if the user cannot be identified by the local cache 6, then it may direct the request to the primary mother cache 32.

In accordance with one presently preferred embodiment, the returned packet from the cache contains the information to identify the user and accounting information of the user. The returned packet also contains an IP address if the user is already assigned an unexpired IP address. In accordance with a further preferred embodiment, the returned packet from the cache may contain three parts: (1) a logical part that containing attributes that the Translation Service uses to perform some consistency checking and reply processing. For example, the User-Session-ID is used to identify which session is free for the incoming user; (2) a check part containing attributes that the MA service should use to verify incoming attributes with the values carried in this session. For example, one of the check attributes may be the Port-ID attribute carrying a specific value. The AAA service will then check with the incoming packet to figure out if the check attribute value matches the port into which the user has been connected; and (3) a reply part containing attributes that are lightly touched by the AAA service and the protocol gateway. For example, if a user already has an unexpired IP Address (a framed IP address), the cache will return that IP address as the Framed-IP-Address attribute.

The Translation Service then returns the pre-processed packet to the AM service. With the retrieved data, the AAA service uses various criteria such as time of the day, number of open sessions, etc., and determines if the user should be allowed to access the data communications network or not (S108). Then the AAA service returns to the protocol gateway an Access-Accept or Access-Reject packet based on the determination. If an Access-Reject is returned, the protocol gateway merely returns the information of "Access-Reject" back to the NAD (S110). If an Access-Accept packet is returned, the protocol gateway checks the reply portion of the returned Access-Accept packet to see if it can find a Framed-IP-Address attribute (S112). If the Framed-IP-Address attribute is not found or contains a value indicating a need to use dynamic IP addressing, then the protocol gateway assumes that it needs to procure an IP address for this user and does so.

Before procuring an IP address from the DHCP server, the protocol gateway ensures that mandatory reply attributes are included in the Access-Accept packet. The mandatory attributes include the User-Home-PoP-ID that is a number defining which PoP the user normally belongs to, and other associated information such as that specifying aspects of the user's agreement with the network service provider. If any of the necessary reply attributes are not supplied, the protocol gateway logs the error with the User-Name attribute that did not have the mandatory attributes and silently discards the packet. If the mandatory attributes are satisfied, the protocol gateway sends an IP address request to the DHCP server. The request is made using, for example, a RADIUS handler. The DHCP server returns an offer with an IP address to the protocol gateway (S114).

When the protocol gateway receives the offer with the IP address, it allocates that IP address to the user, and adds the allocated IP, lease grant time, the PoP ID of the user, and the expiration time to a database for IP address allocation event (S116). The database or a link list collecting events is called a collector. The database for IP address allocation events is coupled with the IP address information interface (IPAII) of the adapter 16.

The protocol gateway then strips the Access-Accept packet of the mandatory attributes such as User-Home-PoP-ID, and returns the Access-Accept packet to the NAD (S118). In the meantime, a timer associated with the database of IP address allocation events (or IP Address Information Interface) expires and the protocol gateway publishes the IP address allocation events (S120). When the IP address allocation events are received, the caches update their records accordingly (S122).

When the Access-Accept packet is successfully received by the NAD and the user has successfully logged into the system (S124), the NAD sends an Accounting Start packet including the information of User-Name, Framed-IP-Address, time logged in, etc., attributes (S126). The protocol gateway relays this information to the AAA (S128). The protocol gateway also adds this information to the database for user accounting events (Accounting Collector) (S130). When the AAA sends an acknowledgement (ACK) back to the protocol gateway, this ACK is returned to the NAD (S131). The protocol gateway may need to keep the ACK information around for a while to see if the NAD has received it. If the NAD has not received the ACK, the NAD would retransmit the Accounting Start packet to the protocol gateway, and the protocol gateway can just return this ACK again. If, after a pre-configured number of retries, the NAD has not received the ACK, the protocol gateway logs this information. These procedures make the user accounting records reliable and error tolerant.

Similarly, when a user logs out, the NAD sends an Accounting Stop packet to the protocol gateway (S132). The protocol gateway again adds this information to the Accounting Collector and forwards the Accounting Stop packet to the AAA (S133). The protocol gateway does the same acknowledge operations that it does for the Accounting Start packet.

In the meanwhile, a timer associated with the database of user accounting events (or User Accounting Interface) expires, and the protocol gateway initiates publishing the user accounting events. Before the user accounting events are published, as shown in FIG. 6B, the protocol gateway first publishes the contents of the database of IP address allocation events (S134). This may be realized by explicitly requesting the publication of the IP address allocation events through the IP Address Information Interface. Then the user accounting events are published through the User Accounting Interface (S136). When the user accounting events are received, the caches and DNS update their records accordingly (S138 and S139). However, since the user accounting event will not have the Home PoP ID information, this event goes to all caches. Caches receive this event but discard it if they cannot find the user in their user record databases (user profiles).

In a PoP, the protocol gateway collects the information about user's IP address, time it was allocated, when this IP will expire, Home PoP ID for the user and maintains this information in the database of IP address allocation events. The IP address allocation events are periodically published via the IP Address Information Interface (implemented in the adapter 16). The logic for the publication of the IP address allocation events separates the allocated IP addresses by the User-Home-PoP-ID attribute. Hence, the protocol gateway publishes the IP address allocation events whenever it sees a different PoP ID from the one it last received, when a timer expires, and when it is going to publish the user accounting events.

Figure 7A:
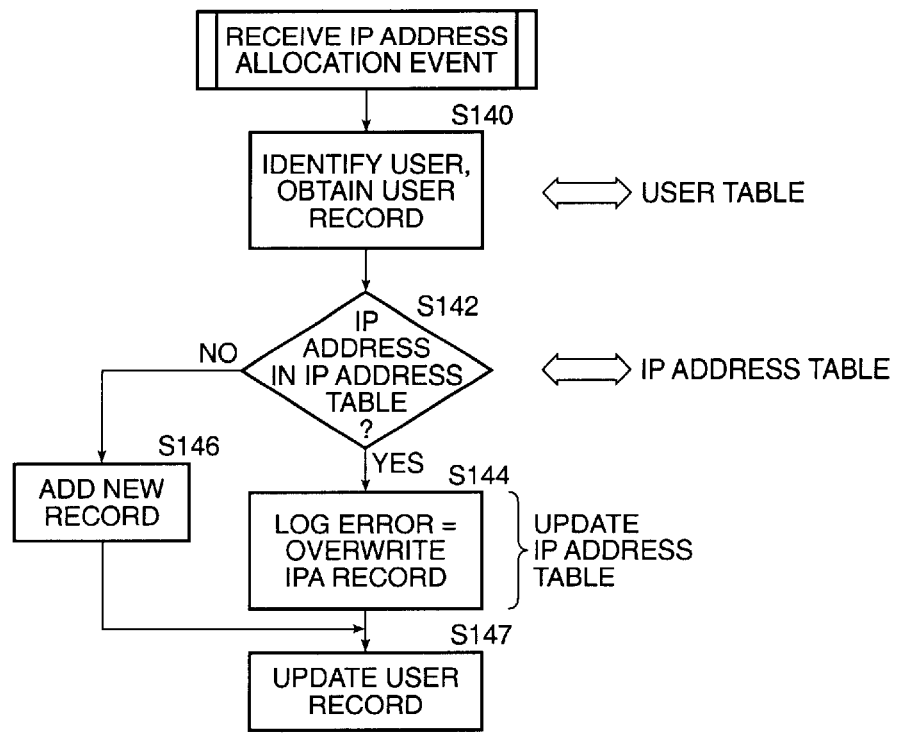
FIGS. 7A and 7B are flow charts illustrating update operations based on the IP address allocation events in accordance with a presently preferred embodiment of the present invention.
Figure 7B:
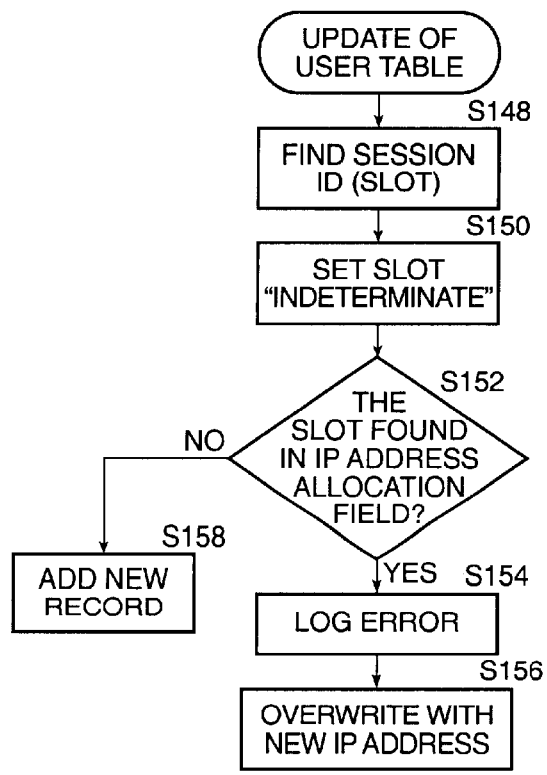

Next, the operations regarding IP address allocation events are described referring to FIGS. 7A and 7B.

The caches implement the IP Address Information Interface (in adapters 16 and 38), and hence subscribe to the IP address allocation events. Since the local caches at PoPs filter the events on their PoP ID, only the caches on which the protocol gateway is publishing and the Mother Caches (primary and secondary) will receive this event. As shown in FIG. 7A, when the cache receives this event, for each transmitted record, it first identifies the user in the user record database (user profile or User Table) and gets the context record (S140). Then it tries to locate the allocated IP address in the IP address database (IP Address Table) (S142). If the IP address is found in the IP Address Table, the system is in error, since this newly allocated IP address should not be found in the IP address table containing IP addresses that have been allocated to users. The cache then logs that error with details on which user's record has been impacted and then overwrites the IP address record with the new information (S144). If no record of the IP address is found in the IP Address Table, a new record is added to the IP Address Table with a short default revoke time (S146). In either case, the cache associates the user context record with this IP address record (S147). Note that only the Mother caches need to implement the IP table logic.

In accordance with a presently preferred embodiment, as shown in FIG. 7B, in the user's record in the User Table, the cache may find the session ID for the allocated IP address in the Session Info field (S148). The cache then proceeds to set that slot to a state of "Indeterminate" (S150), since the cache does not know if the user's Access-Accept packet reached the NAD successfully and the user has indeed logged on. The protocol gateway (or the network controller 30) then finds the session slot in the IP Addresses Allocated field (S152). If that slot contains a different IP address from the one that is being transmitted, the cache logs an error with details on which IP address will be impacted (S154). The cache then overwrites this slot with the new IP address (S156). If that slot does not contain an IP address, the cache fills the slot with the new IP address (S158).

In accordance with a further preferred embodiment, the Mother Caches may implement a temporary table that is used to hold these indeterminate IP addresses. This strategy will greatly speed up the IP address revoke operation that is initiated based on timers.

Figure 8A:
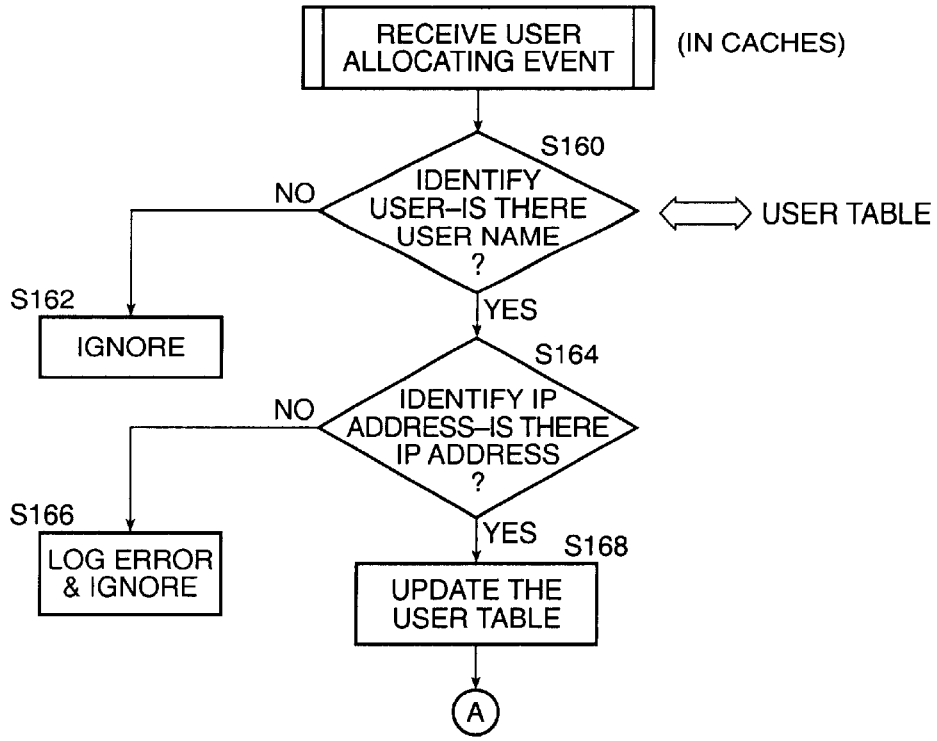
FIGS. 8A and 8B are flow charts illustrating update operations based on the user accounting events in accordance with a presently preferred embodiment of the present invention.
Figure 8B:
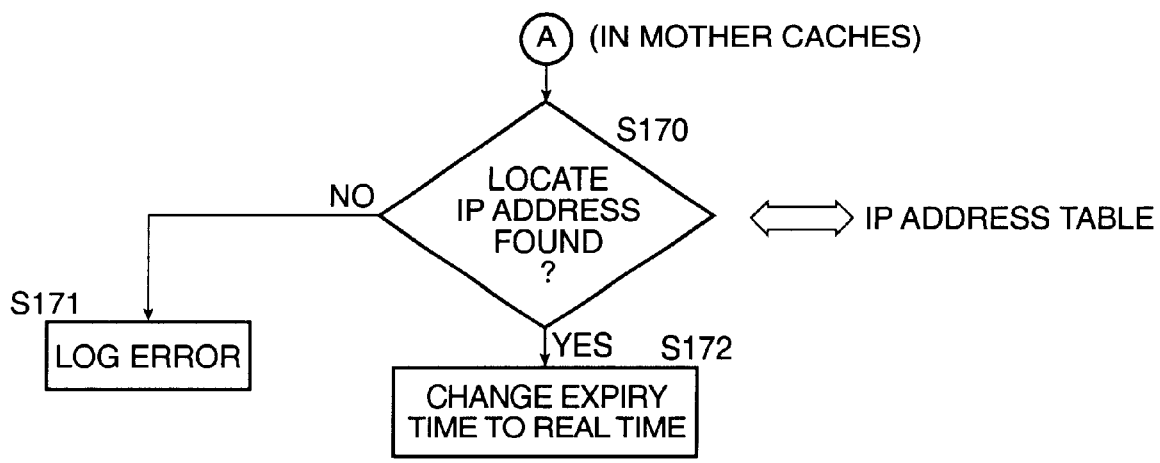
Figure 9:
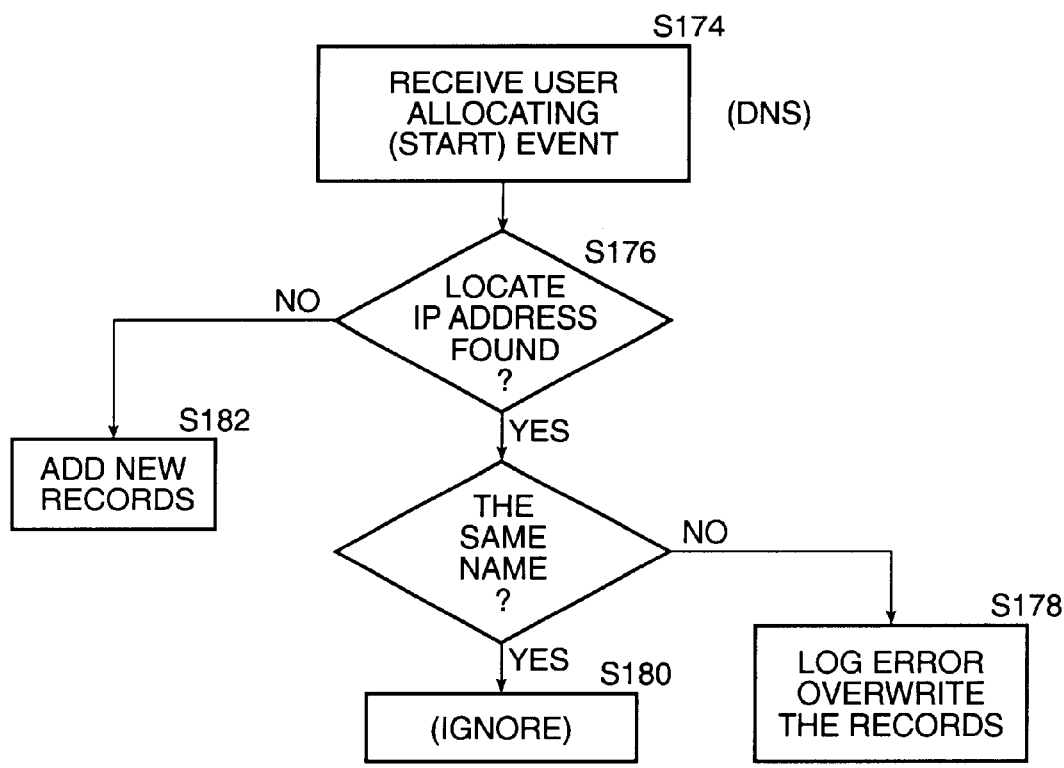
FIG. 9 is a flow chart illustrating update operations in DNS based on the user accounting events in accordance with a presently preferred embodiment of the present invention.

Next, the operations regarding the user accounting events are described referring to FIGS. 8A, 8B, and 9.

The caches implement the User Accounting Interface (in adapters 16 and 38), and therefore subscribe to the user accounting event. As shown in FIG. 8A, on receipt of this event, for each transmitted record in this event, the caches identify the user by looking up the user name in the User table (S160). If the user is not found in the User Table, the cache ignores the record (S162). When the user name is found in the User Table, the cache will identify the IP address in the IP Address Allocated field in the User Table (S164). If the IP address is not found, the cache logs the error with information on the user record that is incorrect and the IP address that is affected and ignore the record (S166).

When the IP Address is found in the IP Address Allocated field, the cache gets the offset of this IP address in the field and uses the same offset on the Session Information field (S168). It changes that session slot to logged in or out depending on what the record is carrying (accounting start or stop). For example, upon receiving an accounting start event, the time at which the IP address allocated (lease grant time) may be changed into the time at which the user logged in with this IP address (log-in time). Upon receiving the accounting stop event, the actual session time of the user may be recorded instead of lease time of the IP address.

The above operations are performed in local caches and mother caches. However, in the mother caches there are additional operations. As shown in FIG. 8B, the mother caches try to locate the IP address reported by the accounting event in the IP Address Table (S170). If the IP address is not found in the IP Address Table, the mother cache logs the error (S171). If found, the mother cache changes the expiry time of the IP address returned by the DHCP server into the real expiry time upon the user's log-off (S172).

The DNS server also implements the User Accounting Interface (in the adapter 50). However, the DNS server is obliged to subscribe to only the accounting start events. The DNS server waits for the IP revoke event from the primary mother cache to remove an entry of association between IP address and domain name. As shown in FIG. 9, on receiving the user accounting events, the DNS server only processes the accounting start event (S174). The DNS server first tries to locate the IP address which is being reported (S176). If the name associated with the IP address is not the same as the one reported by the event, the DNS server logs the error and overwrites the existing entry (S178). If the name associated with the IP address is the same as the one supplied in this event, the DNS server may ignore that record (S180). When a record is not found for the IP address, the DNS server adds a new entry for the IP address and sets the name by converting the fully qualified domain name to "host" format (S182).

In accordance with a further preferred embodiment, the mother caches implement a temporary table to hold indeterminate IP addresses. In this case, when the mother cache receives the user accounting events confirming the user's log-in, it will move the IP address records to the main IP Address Table.

Next, IP address revoke operations are described. While all the mother caches may maintain the IP Address Table, only the network controller having the Primary Mother Cache is responsible for revoking the IP addresses. The NOC may use different algorithms to revoke IP addresses. For example, in accordance with one presently preferred embodiment, the IP address revoke operation may be performed based on a timer, and in accordance with another, the IP address revoke operation may be performed when an accounting stop event is received for a user whose IP address has expired.

Figure 10A:
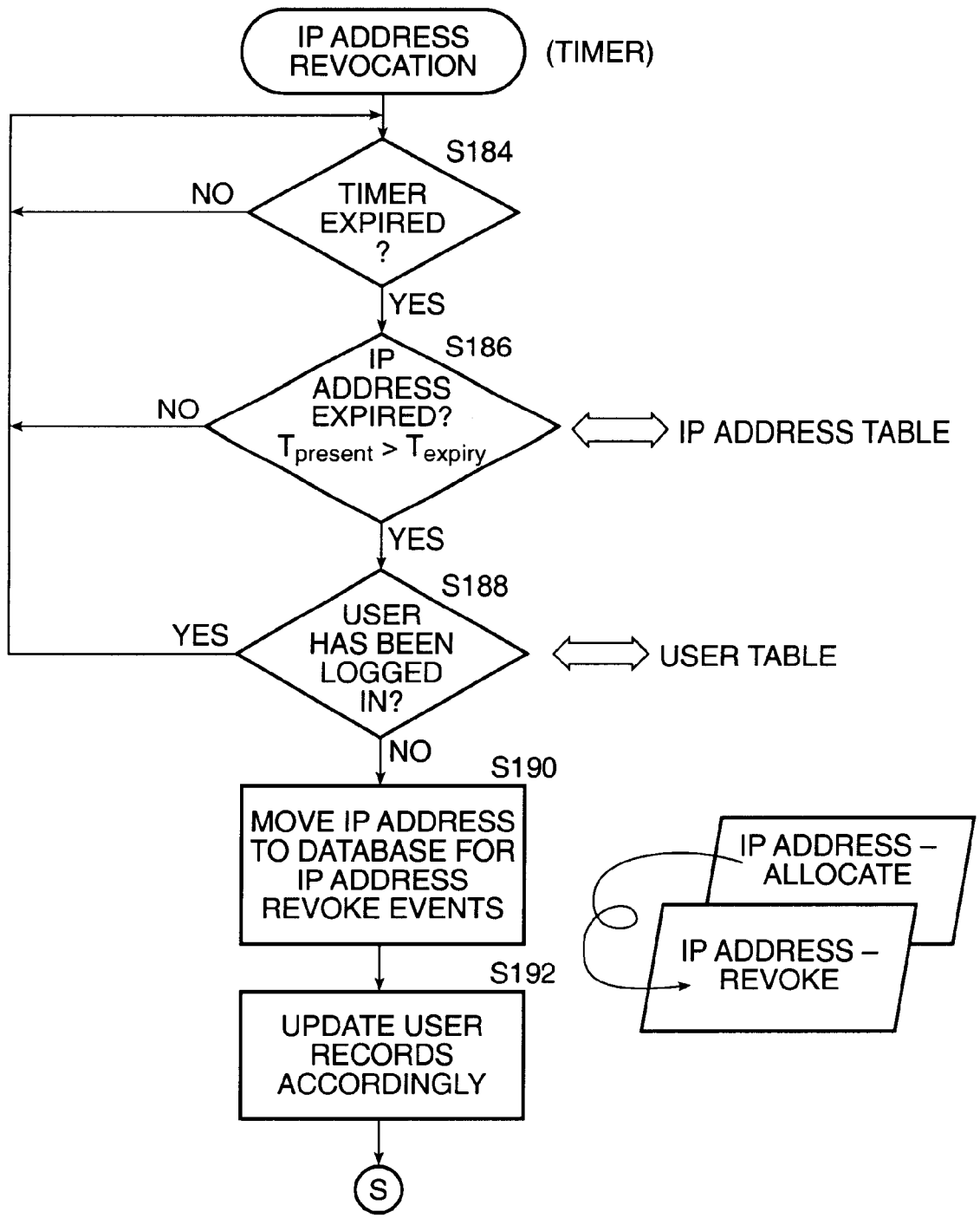
FIGS. 10A and 10B are flow charts illustrating exemplary operations producing a database for the IP address revoke events in accordance with a presently preferred embodiment of the present invention.

FIG. 10A illustrates one presently preferred embodiment of the IP address revoke operation. The network controller 30 implements a timer and associates the timer with the IP Address Table maintained in the Primary Mother Cache. When the timer expires (S184), the network controller 30 examines the IP address Table to identify IP addresses that may need to be revoked. The network controller 30 adds the expiry time (seconds) allocated for the IP address (plus a configured grace time) to the time the IP address was allocated, and compares that time with the present time (S186). If the IP address has expired, the network controller 30 looks up the associated user record in the User Table to determine if the user has logged on or not (S188). If the user is not logging on, the network controller 30 then moves that IP address to a database for IP address revoke events (S190). In accordance with a presently preferred embodiment, this database may be a table of IP addresses that need to be revoked (IP Address Revoke Table). The network controller 30 also updates the correct offset in the IP Address Allocated field of the User Table to reflect that the IP address has been revoked and adjusts the same offset in the Session Information field to reflect that this session is now available (S192). Then, as shown in FIG. 10C, based on a timer, the network controller 30 periodically publishes the IP address revoke events through the IP Address Management Interface (S200).

Figure 10B:
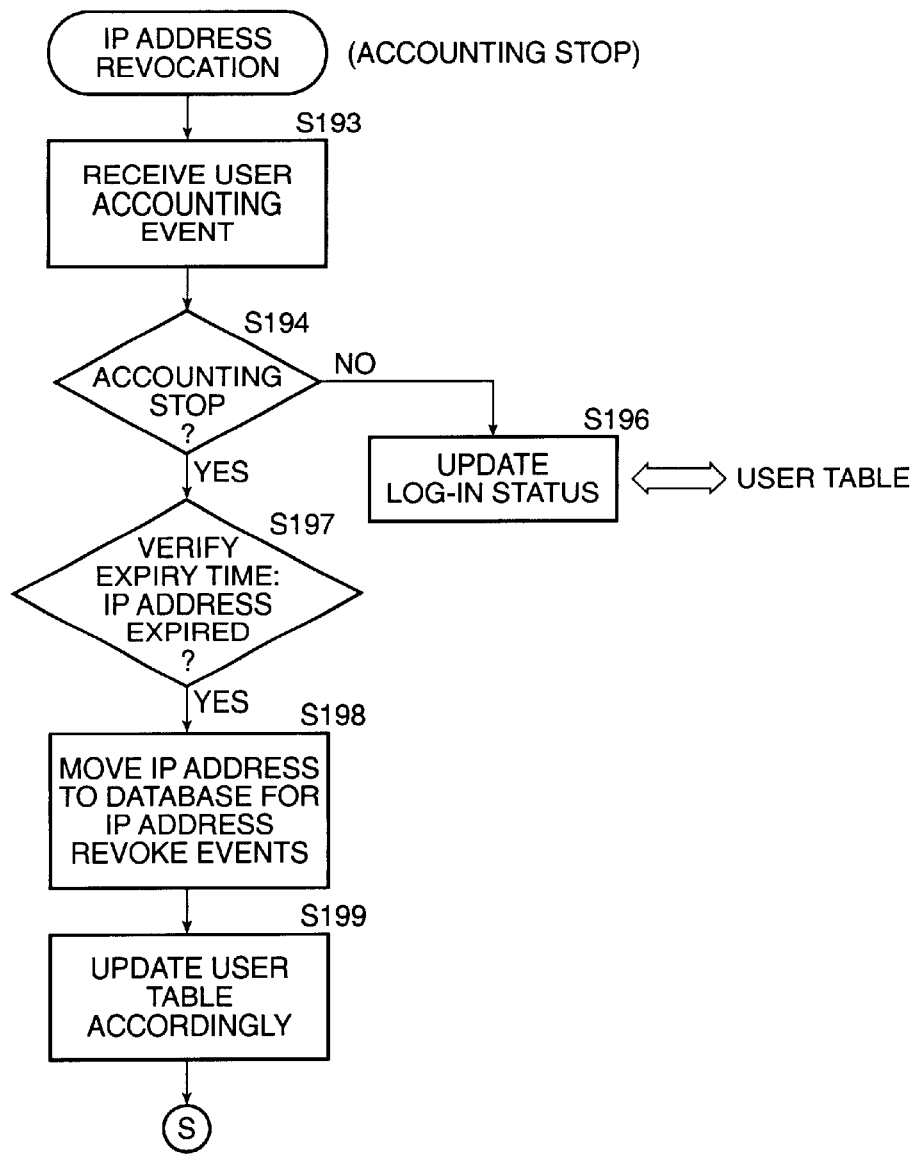
Figure 10C:
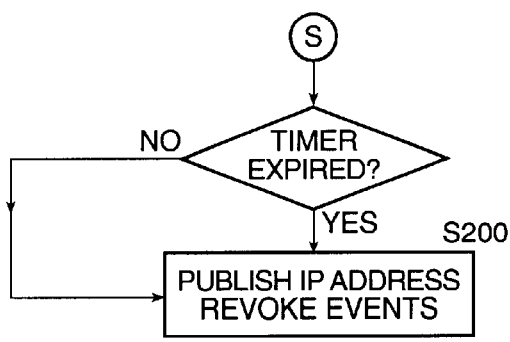
FIG. 10C is a flow chart illustrating operations publishing the IP address revoke events in accordance with a presently preferred embodiment of the present invention.

FIG. 10B illustrates another presently preferred embodiment of the IP address revoke operation. In this embodiment, when a user accounting event is received (S193), the network controller 30 determines that the event is an accounting start or accounting stop (S194). When an accounting start event is received, the network controller 30 updates the log-in status of the user based on each record that is transmitted (S196). However, when the network controller 30 receives an accounting stop event, it immediately verifies that the session's IP address has not expired (S197). If the IP address for the session has expired, the network controller 30 moves the IP address to the database for IP address revoke events (or IP Address Revoke Table) (S198). The following operations of updating the User Table are the same as for the previous embodiment (S199). Then, as shown in FIG. 10C, based on a timer, the network controller 30 periodically publishes the IP address revoke events through the IP Address Management Interface (S200).

Figure 11:
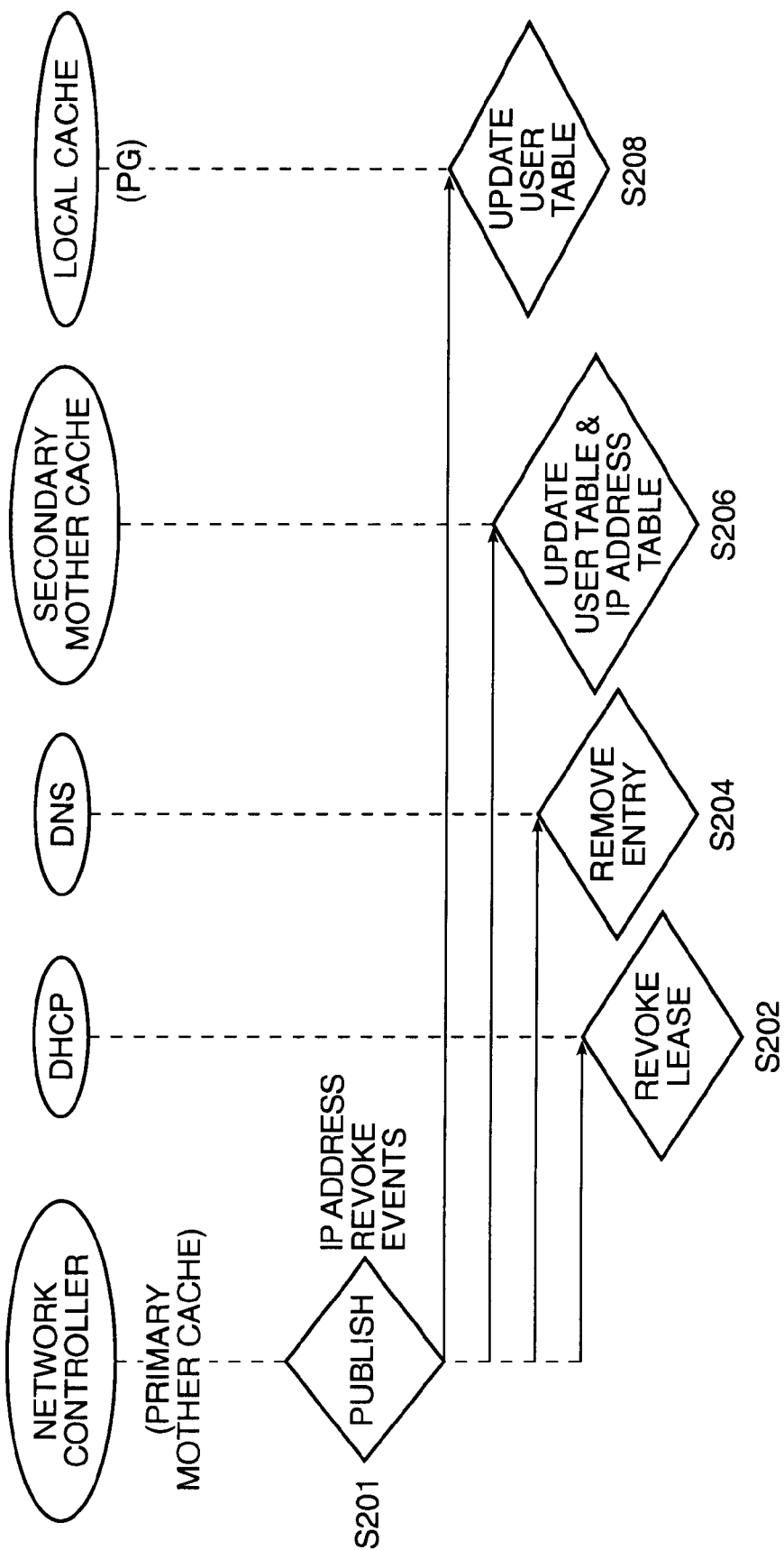
FIG. 11 a process flow diagram illustrating update operations based on the IP address revoke events in accordance with a presently preferred embodiment of the present invention.

As shown in FIG. 11, the IP address revoke events published by the network controller (S201) are subscribed to by the DHCP server, DNS server, secondary mother caches, and local caches (preferably associated with protocol gateways in each PoP). In accordance with a further preferred embodiment, the IP address revoke events are published with a list of IP addresses to be revoked and home PoP IDs of the IP addresses where they are stored (i.e., the home PoP ID of a DHCP server having an IP pool in which the IP address is included). The DHCP server, DNS server, secondary mother caches, and local caches implement the IP Address Management Interface via their adapters, so as to subscribe to the IP address revoke event. On receipt of this event, the DHCP server revokes the lease and marks that lease as available (S202). The DNS server removes the record for (or removes the name association with) the IP address (S204). The secondary mother caches receive all these events, as they do not filter on the Home Pop ID. They update their records by removing the IP address reference in the User Table and in the IP Address Table (S206). Since the local caches filter the events on their Home PoP ID, they would only receive events that concern users in their respective PoPs. On receipt of this record, the local cache removes the reference of the IP address from the user's record in the User Table (S208).

Accordingly, the present invention provides a scaleable solution for managing dynamic IP addresses in an integrated way, which deals with multiple DHCP servers spread across multiple PoPs. Further, according to the present invention the solution is realized using open and well understood standards.

The present invention provides IP address management whereby information on IP addresses that are dynamically assigned to users is automatically made available. The present invention also provides IP address management enables distributed DHCP servers to contain pools of IP addresses that are centrally managed. Further, the IP allocation and revocation algorithm provides the update of user profiles in distributed databases such as caches in reliable and fault-tolerant manner.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An IP address management system for managing dynamic IP address allocation in a data communications network having a point of presence, a network access device, an Authentication, Authorization and Accounting (AAA) server and a dynamic IP allocation server associated with said point of presence, said system comprising:

a protocol gateway in communication with the network access device;

said AAA server in communication with said protocol gateway;

said dynamic IP allocation server in communication with said protocol gateway;

a local memory in communication with the protocol gateway; and a local memory publisher, said local memory publisher periodically publishing to subscribers contents of said local memory over an information bus.

2. A system in accordance with claim 1 wherein said protocol gateway submits a query to said AAA server in response to an attempted log-in by a user through the network access device, said protocol gateway receiving an IP address previously assigned to said user if said user is authorized to log-in and said IP address is currently allocated to said user, said protocol gateway receiving a leased IP address from said dynamic IP allocation server if said user is authorized to log-in and an IP address is not currently allocated to said user.

3. A system in accordance with claim 2 wherein said local memory stores IP address allocation events until said events are published by said local memory publisher, each said IP allocation event including a user identification and an IP address allocated to said user.

4. A system in accordance with claim 3 wherein said IP address allocation events further include a time stamp indicating when said IP address was allocated to said user.

5. A system in accordance with claim 4 wherein said IP address allocation events further include a home point of presence (PoP) ID corresponding to said user's home PoP ID.

6. A system in accordance with claim 5 wherein said IP address allocation events further include an expiration time for said IP address allocated to said user.

7. A system in accordance with claim 6 wherein said IP address allocation events further include a session number.

8. A system in accordance with claim 7 wherein said protocol gateway receives reports from the network access device corresponding to user log-in events and user log-out events.

9. A system in accordance with claim 8 wherein said protocol gateway maintains user accounting event records in said local memory until said local memory publisher publishes said events, said user accounting event records including user identification information, an IP address assigned to the user and a time at which the event occurred.

10. A system in accordance with claim 9 wherein said user accounting event records include accounting start event records which correspond to user log-in events and accounting stop event records corresponding to user log-out events.

11. A system in accordance with claim 10 wherein said local memory publisher publishes the contents of said local memory as lists, a first list collecting said IP address allocation events, a second list collecting accounting start events and a third list collecting accounting stop events.

12. A system in accordance with claim 11, further comprising:
a timer, said local memory publisher publishing contents of said local memory at times determined by said timer.

13. A system in accordance with claim 3, further comprising:
a timer, said local memory publisher publishing contents of said local memory at times determined by said timer.

14. A system in accordance with claim 3 wherein in response to said query to said AAA server, said protocol gateway receives information including the latest home point of presence (PoP) ID of said user.

15. A system in accordance with claim 14 wherein the network access device forwards a user identification and a network access device PoP ID to said protocol gateway in response to an attempted log-in by said user.

16. A system in accordance with claim 15 wherein said local memory publisher publishes IP address allocation events when a PoP ID received from the network access device differs from said latest home PoP ID of said user.

17. A system in accordance with claim 2, further comprising:
a network controller in communication with said protocol gateway over an information bus;
a controller memory associated with said network controller;
a controller memory publisher associated with said controller memory, said controller memory publisher periodically publishing to subscribers contents of said controller memory over an information bus;
a controller subscriber associated with said network controller, said controller subscriber subscribing to IP address allocation events and user accounting events published by said protocol gateway; and
an IP address revoke database maintained in said controller memory, said database containing IP address revoke events, said IP address revoke events held in said IP address revoke database until said controller memory publisher publishes contents of said controller memory over an information bus.

18. A system in accordance with claim 17, further comprising:
an IP address allocation database maintained in said controller memory, said IP address allocation database including entries having user identification and allocated IP address for said users for a plurality of points of presence on the data communications network.

19. A system in accordance with claim 18 wherein said IP address allocation database further includes for each entry an IP address expiration time.

20. A system in accordance with claim 19, further comprising:
a controller database updater associated with said network controller, said controller database updater updating said IP address allocation database in response to IP address allocation events and user accounting events received by said controller subscriber.

21. A system in accordance with claim 20, further comprising:
a clock, said network controller periodically examining said IP address allocation database maintained in said controller memory and said clock so as to determine if an IP address has expired, said network controller removing said expired IP address entries from said IP address database upon confirming log-out of a user to whom said expired IP address was allocated.

22. A system in accordance with claim 20 wherein:
said controller subscriber receives user accounting stop events published by said protocol gateway, and
said network controller removes IP addresses from said IP address allocation database and places said IP addresses into said IP address revoke database.

23. A system in accordance with claim 22 wherein:
said network controller removes IP addresses from said IP address allocation database in response to the receipt by said controller subscriber of user accounting stop events corresponding to users to whom said IP addresses are allocated.

24. A system in accordance with claim 22 wherein:
said network controller removes IP addresses from said IP address allocation database in response to the expiration of said IP addresses.

25. A system in accordance with claim 18, further comprising:
a controller database updater associated with said network controller, said controller database updater updating said IP address allocation database in response to IP address allocation events and user accounting events received by said controller subscriber.

26. A system in accordance with claim 17, further comprising:
a dynamic IP allocation subscriber associated with said dynamic IP allocation server, said dynamic IP allocation subscriber subscribing to IP address revoke events published by said controller memory publisher over said information bus.

27. A system in accordance with claim 26, further comprising:
means associated with said dynamic IP allocation server for revoking leased IP addresses in response to receipt of published IP address revoke events.

28. A system in accordance with claim 17, further comprising:
a domain name system (DNS) server maintaining an association database mapping between domain names and IP addresses; and
a DNS subscriber associated with said DNS server, said DNS subscriber subscribing to IP address revoke events and accounting start events.

29. A system in accordance with claim 28 wherein:
said DNS server adds mappings between domain names and IP addresses to its association database in response to accounting start events received from said protocol gateway.

30. A system in accordance with claim 29 wherein:
said DNS server deletes mappings between domain names and IP addresses from its association database in response to IP address revoke events received from said controller memory publisher.

31. A system in accordance with claim 3, further comprising:
an IP addresses allocated database maintained in said local memory, said IP addresses allocated database containing information including IP addresses allocated to users at the point of presence and user identification information for each IP address allocated at the point of presence.

32. A system in accordance with claim 31, further comprising:
a user record database maintained in said local memory, said user record database containing information relating to users having a current home PoP ID the same as that of the point of presence.

33. A system in accordance with claim 32, further comprising:
a protocol gateway subscriber associated with said protocol gateway for subscribing to IP address allocation events and IP address revoke events form locations other than the point of presence.

34. A system in accordance with claim 33, further comprising:
a protocol gateway updater associated with said protocol gateway, said protocol gateway updater updating a local address information database maintained in said local memory in response to IP address allocation events and IP address revoke events received, said local address information database containing IP addresses allocated and corresponding user identification records.

35. A system in accordance with claim 34 wherein said protocol gateway subscriber further subscribes to accounting start events and said protocol gateway updater further updates said local address information database maintained in said local memory regarding IP addresses allocated and corresponding user identification records in response to said accounting start events.

36. A system in accordance with claim 35, further comprising:
a temporary database maintained by said protocol gateway updater, said temporary database containing IP addresses reported by IP address allocation events received by said protocol gateway subscriber until said IP addresses are also reported by accounting start events received by said protocol gateway subscriber.

37. A system in accordance with claim 36 wherein said local address information database is updated to include a particular IP address as currently allocated only after an IP address allocation event specifying said particular IP address has been followed by a corresponding accounting start event specifying said particular IP address.

38. A system in accordance with claim 37, further comprising:
a home PoP ID filter associated with said protocol gateway, said filter selectively passing published events corresponding to the PoP ID of the point of presence.

39. A system in accordance with claim 34 wherein said protocol gateway subscriber further subscribes to accounting start events and accounting stop events and said protocol gateway updater further updates said local address information database maintained in said local memory regarding IP addresses allocated and corresponding user identification records in response to said accounting start events and said accounting stop events.

40. A system in accordance with claim 3, further comprising:
a protocol gateway subscriber associated with said protocol gateway for subscribing to IP address allocation events and IP address revoke events form locations other than the point of presence.

41. A system in accordance with claim 40, further comprising:
a protocol gateway updater associated with said protocol gateway, said protocol gateway updater updating information maintained in said local memory regarding IP addresses allocated and corresponding user identification records in response to IP address allocation events and IP address revoke events received.

42. A system in accordance with claim 1 wherein said protocol gateway receives reports from the network access device corresponding to user log-in events and user log-out events.

43. A system in accordance with claim 42 wherein said protocol gateway maintains user accounting event records in said local memory until said local memory publisher publishes said events, said user accounting event records including user identification information, an IP address assigned to the user and a time at which the event occurred.

44. A system in accordance with claim 43 wherein said user accounting event records include accounting start event records which correspond to user log-in events and accounting stop event records corresponding to user log-out events.

45. A system in accordance with claim 43, further comprising:
a timer, said local memory publisher publishing contents of said local memory at times determined by said timer.

46. A method for managing IP addresses on a data communications network including: a network access device in a point of presence (PoP) for providing user access to the data communications network; a protocol gateway coupled to said network access device; a local memory associated with said protocol gateway; an authentication, authorization and accounting (AAA) server providing user authentication, authorization and accounting information to said protocol gateway; and a dynamic IP address server maintaining a pool of IP addresses, said method comprising:
querying said AAA server upon attempted log-in to said data communications network by a user through said network access device to determine if said user is an authorized user and if an IP address is already allocated to said user;
receiving an IP address from said AAA service if said user is authorized to access the data communications network and an IP address is already allocated to said user,
obtaining an available IP address from said pool of IP addresses if said user is authorized to access the data communications network and an IP address is not already allocated to said user;
allocating said received or obtained IP address to the user;
maintaining in said local memory a database for IP address allocation events each including an IP address allocated to a user and associated user identification information until said IP address allocation events are published; and
periodically publishing said IP address allocation events.

47. A method according to claim 46, wherein said each IP address allocation event includes a user name, an IP address allocated to the user, time at which the IP address is allocated, expiry time of the IP address, and a home PoP ID for the user.

48. A method according to claim 47, wherein said each IP address allocation event further includes a session number for the IP address.

49. A method according to claim 46, further comprising:
receiving from said network access device users' log-in and log-out information;
maintaining in said local memory a database for user accounting events including users' log-in and log-off records until said user accounting events are published; and
periodically publishing said user accounting events.

50. A method according to claim 49, wherein said user accounting events include:
accounting start events each including a user name, an IP address, and time at which the user logged in; and
accounting stop events each including a user name, and IP address, and time at which the user logged out.

51. A method according to claim 49, wherein in said periodically publishing said IP address allocation events are published based on a timer associated with said database for said IP address allocation events.

52. A method according to claim 51, wherein said IP address allocation events are further published before said user accounting events are published.

53. A method according to claim 52, further including:
receiving from said network access device user information including a user name and a PoP ID upon a user's attempted log-in to the data communications network;
obtaining latest PoP ID records for said user from said AAA service; and
publishing said IP address allocation events when said PoP ID received from said network access device is different from a latest PoP ID in said PoP ID records obtained from said AAA service.

54. A method according to claim 49, wherein said data communications network further includes: a network controller in communication with said protocol gateway; and a controller memory associated with said network controller, said method further comprising:
subscribing at said network controller to said IP address allocation events and said user accounting events published from said local memory,
producing a database for IP address revoke events including IP addresses to be revoked;
maintaining said database in said controller memory until said IP address revoke events are published; and
periodically publishing said IP address revoke events.

55. A method according to claim 54, further comprising:
maintaining in said local memory information on IP addresses allocated and user identification records for said point of presence;
subscribing at said protocol gateway to said IP address allocation events and said IP address revoke events; and
updating contents of said local memory information on IP addresses allocated and user identification records based on said IP address allocation events and said IP address revoke events received at said protocol gateway.

56. A method according to claim 55, further comprising:
maintaining in said controller memory information on IP addresses allocated and user identification records for said data communications network; and
updating said information on IP addresses allocated and user identification records in said controller memory based on said IP address allocation events and said user accounting events subscribed to.

57. A method according to claim 56, wherein said AAA service obtains said authorization, authentication and accounting information from said local memory and said controller memory.

58. A method according to claim 54, further comprising:
maintaining in said local memory an IP address database storing IP address information including IP addresses currently allocated to users, said IP addresses being included in said pool of IP addresses;
maintaining in said local gateway memory a user record database storing user identification information for users having a home PoP ID the same as a PoP ID of said network access device; and
updating the contents of said IP address database and said user record database based on said IP address allocation events and said IP address revoke events received at said protocol gateway.

59. A method according to claim 58, further comprising:
subscribing at said protocol gateway to said accounting start events; and
further updating contents of said IP address database based on said accounting start events.

60. A method according to claim 59, further comprising:
subscribing at said protocol gateway to said accounting stop events; and
further updating contents of said user record database based on said accounting start events and accounting stop events.

61. A method according to claim 59, further comprising:
maintaining a temporary database containing IP addresses reported by said IP address allocation events until reported by said accounting start events; and
moving said IP addresses from said temporary database to said IP address database when the IP addresses are reported by said accounting start events.

62. A method according to claim 59, further comprising:
filtering on users' home PoP IDs at said protocol gateway so as to receive events for users having a home PoP ID of said point of presence.

63. A method according to claim 54, further comprising:
maintaining in said controller memory an IP address database storing IP address information including IP addresses currently allocated to users;
maintaining in said controller memory a user record database storing user identification information; and
updating said IP address database and said user record database in said controller memory based on said IP address allocation events and said user accounting events subscribed to.

64. A method according to claim 63, where in said IP address information further includes user names and respective expiry time of the IP addresses allocated to the users, said method further comprising:
periodically examining said IP address database based on a timer so as to determine if an IP address has expired;
confirming on said user record database that a user to whom said expired IP address has been allocated logged out; and removing said expired and confirmed IP addresses from said IP address database to said database for IP address revoke events.

65. A method according to claim 63, wherein said IP address information further includes user names and respective expiration times of the IP addresses allocated to the users, said method further comprising:

verifying the expiration time of IP addresses on said IP address database when the IP addresses are reported by said accounting stop events subscribed to; and removing said reported and verified IP addresses from said IP address database to said database for IP address revoke events.

66. A method according to claim 65, further comprising:

updating contents of said user record database in said controller memory in accordance with changes in said IP address database.

67. A method according to claim 54, further comprising:

subscribing at said dynamic IP address server to at least said IP address revoke events; and revoking leases of IP addresses reported by said IP address revoke events and making said IP addresses available to users by putting them back in the IP address pool.

68. A method according to claim 54, said data communications network further including a domain name system server (DNS) for maintaining associations between users' domain names and IP addresses, said method further comprising:

subscribing at said DNS to at least said accounting start events and said IP address revoke events; and adding entries of said associations for IP addresses reported by said accounting start events subscribed to; and deleting entries of said associations for IP addresses reported by said IP address revoke events subscribed to.

69. A method according to claim 49, further comprising:

updating contents of said user record database in said controller memory in accordance with changes in said IP address database.

70. A program storage device readable by a machine, embodying a program of instructions executable by the machine to perform a method to manage IP addresses on a data communications network comprising: a network access device in a point of presence (PoP) for providing user access to the data communications network; a protocol gateway coupled to said network access device; a local memory associated with said protocol gateway; an authentication, authorization and accounting (AAA) server providing user authentication, authorization and accounting information to said protocol gateway; and a dynamic IP address server maintaining a pool of IP addresses, the method comprising:

querying said AAA server upon attempted log-in to said data communications network by a user through said network access device to determine if said user is an authorized user and if an IP address is already allocated to said user;

receiving an IP address from said AAA service if said user is authorized to access the data communications network and an IP address is already allocated to said user, obtaining an available IP address from said pool of IP addresses if said user is authorized to access the data communications network and an IP address is not already allocated to said user;

allocating said received or obtained IP address to the user;

maintaining in said local memory a database for IP address allocation events each comprising an IP address allocated to a user and associated user identification information until said IP address allocation events are published; and periodically publishing said IP address allocation events.

71. The program storage device of claim 70 wherein said each IP address allocation event comprises a user name, an IP address allocated to the user, time at which the IP address is allocated, expiry time of the IP address, and a home PoP ID for the user.

72. The program storage device of claim 71 wherein said each IP address allocation event further comprises a session number for the IP address.

73. The program storage device of claim 70 wherein said method further comprises:

receiving from said network access device users' log-in and log-out information;

maintaining in said local memory a database for user accounting events comprising users' log-in and log-off records until said user accounting events are published; and periodically publishing said user accounting events.

74. The program storage device of claim 73 wherein said user accounting events include:

accounting start events each comprising a user name, an IP address, and time at which the user logged in; and accounting stop events each comprising a user name, and IP address, and time at which the user logged out.

75. The program storage device of claim 73 wherein said periodically publishing said IP address allocation events are published based on a timer associated with said database for said IP address allocation events.

76. The program storage device of claim 75 wherein said IP address allocation events are further published before said user accounting events are published.

77. The program storage device of claim 76 wherein said method further comprises:

receiving from said network access device user information comprising a user name and a PoP ID upon a user's attempted log-in to the data communications network;

obtaining latest PoP ID records for said user from said AAA service; and publishing said IP address allocation events when said PoP ID received from said network access device is different from a latest PoP ID in said PoP ID records obtained from said AAA service.

78. The program storage device of claim 73 wherein said data communications network further comprises: a network controller in communication with said protocol gateway; and a controller memory associated with said network controller, said method further comprising:

subscribing at said network controller to said IP address allocation events and said user accounting events published from said local memory, producing a database for IP address revoke events comprising IP addresses to be revoked;

maintaining said database in said controller memory until said IP address revoke events are published; and periodically publishing said IP address revoke events.

79. The program storage device of claim 78 wherein said method further comprises:

maintaining in said local memory information on IP addresses allocated and user identification records for said point of presence;

subscribing at said protocol gateway to said IP address allocation events and said IP address revoke events; and updating contents of said local memory information on IP addresses allocated and user identification records based on said IP address allocation events and said IP address revoke events received at said protocol gateway.

80. The program storage device of claim 79 wherein said method further comprises:

maintaining in said controller memory information on IP addresses allocated and user identification records for said data communications network; and updating said information on IP addresses allocated and user identification records in said controller memory based on said IP address allocation events and said user accounting events subscribed to.

81. The program storage device of claim 80 wherein said AAA service obtains said authorization, authentication and accounting information from said local memory and said controller memory.

82. The program storage device of claim 78 wherein said method further comprises:

maintaining in said local memory an IP address database storing IP address information comprising IP addresses currently allocated to users, said IP addresses being included in said pool of IP addresses;

maintaining in said local gateway memory a user record database storing user identification information for users having a home PoP ID the same as a PoP ID of said network access device; and updating the contents of said IP address database and said user record database based on said IP address allocation events and said IP address revoke events received at said protocol gateway.

83. The program storage device of claim 82 wherein said method further comprises:

subscribing at said protocol gateway to said accounting start events; and further updating contents of said IP address database based on said accounting start events.

84. The program storage device of claim 83 wherein said method further comprises:

subscribing at said protocol gateway to said accounting stop events; and further updating contents of said user record database based on said accounting start events and accounting stop events.

85. The program storage device of claim 83 wherein said method further comprises:

maintaining a temporary database containing IP addresses reported by said IP address allocation events until reported by said accounting start events; and moving said IP addresses from said temporary database to said IP address database when the IP addresses are reported by said accounting start events.

86. The program storage device of claim 83 wherein said method further comprises:

filtering on users' home PoP IDs at said protocol gateway so as to receive events for users having a home PoP ID of said point of presence.

87. The program storage device of claim 78 wherein said method further comprises:

maintaining in said controller memory an IP address database storing IP address information comprising IP addresses currently allocated to users;

maintaining in said controller memory a user record database storing user identification information; and updating said IP address database and said user record database in said controller memory based on said IP address allocation events and said user accounting events subscribed to.

88. The program storage device of claim 87 wherein said IP address information further comprises user names and respective expiry time of the IP addresses allocated to the users, said method further comprising:

periodically examining said IP address database based on a timer so as to determine if an IP address has expired;

confirming on said user record database that a user to whom said expired IP address has been allocated logged out; and removing said expired and confirmed IP addresses from said IP address database to said database for IP address revoke events.

89. The program storage device of claim 87 wherein said IP address information further comprises user names and respective expiration times of the IP addresses allocated to the users, said method further comprising:

verifying the expiration time of IP addresses on said IP address database when the IP addresses are reported by said accounting stop events subscribed to; and removing said reported and verified IP addresses from said IP address database to said database for IP address revoke events.

90. The program storage device of claim 89 wherein said method further comprises:

updating contents of said user record database in said controller memory in accordance with changes in said IP address database.

91. The program storage device of claim 78 wherein said method further comprises:

subscribing at said dynamic IP address server to at least said IP address revoke events; and revoking leases of IP addresses reported by said IP address revoke events and making said IP addresses available to users by putting them back in the IP address pool.

92. The program storage device of claim 78, the method further comprising:

subscribing at a domain name system (DNS) server to at least said accounting start events and said IP address revoke events, said DNS server for maintaining associations between users' domain names and IP addresses;

adding entries of said associations for IP addresses reported by said accounting start events subscribed to; and deleting entries of said associations for IP addresses reported by said IP address revoke events subscribed to.

93. The program storage device of claim 73 wherein said method further comprises:

updating contents of said user record database in said controller memory in accordance with changes in said IP address database.

94. An apparatus to manage IP addresses on a data communications network comprising: a network access device in a point of presence (PoP) for providing user access to the data communications network; a protocol gateway coupled to said network access device; a local memory associated with said protocol gateway; an authentication, authorization and accounting (AAA) server providing user authentication, authorization and accounting information to said protocol gateway; and a dynamic IP address server maintaining a pool of IP addresses, the apparatus comprising:
- means for querying said AAA server upon attempted log-in to said data communications network by a user through said network access device to determine if said user is an authorized user and if an IP address is already allocated to said user;
- means for receiving an IP address from said AAA service if said user is authorized to access the data communications network and an IP address is already allocated to said user,
- means for obtaining an available IP address from said pool of IP addresses if said user is authorized to access the data communications network and an IP address is not already allocated to said user;
- means for allocating said received or obtained IP address to the user;
- means for maintaining in said local memory a database for IP address allocation events each comprising an IP address allocated to a user and associated user identification information until said IP address allocation events are published; and
- means for periodically publishing said IP address allocation events.

95. The apparatus of claim 94 wherein said each IP address allocation event comprises a user name, an IP address allocated to the user, time at which the IP address is allocated, expiry time of the IP address, and a home PoP ID for the user.

96. The apparatus of claim 95 wherein said each IP address allocation event further comprises a session number for the IP address.

97. The apparatus of claim 94 wherein said method further comprises:
- means for receiving from said network access device users' log-in and log-out information;
- means for maintaining in said local memory a database for user accounting events comprising users' log-in and log-off records until said user accounting events are published; and
- means for periodically publishing said user accounting events.

98. The apparatus of claim 97 wherein said user accounting events include:
- accounting start events each comprising a user name, an IP address, and time at which the user logged in; and
- accounting stop events each comprising a user name, and IP address, and time at which the user logged out.

99. The apparatus of claim 97 wherein said means for periodically publishing said IP address allocation events comprises means for publishing said IP address allocation events based on a timer associated with said database for said IP address allocation events.

100. The apparatus of claim 99 wherein said IP address allocation events are further published before said user accounting events are published.

101. The apparatus of claim 100 wherein said apparatus further comprises:
- means for receiving from said network access device user information comprising a user name and a PoP ID upon a user's attempted log-in to the data communications network;
- means for obtaining latest PoP ID records for said user from said AAA service; and
- means for publishing said IP address allocation events when said PoP ID received from said network access device is different from a latest PoP ID in said PoP ID records obtained from said AAA service.

102. The apparatus of claim 97 wherein
said data communications network further comprises:
- a network controller in communication with said protocol gateway; and
- a controller memory associated with said network controller; and said apparatus further comprises:
  - means for subscribing at said network controller to said IP address allocation events and said user accounting events published from said local memory,
  - means for producing a database for IP address revoke events comprising IP addresses to be revoked;
  - means for maintaining said database in said controller memory until said IP address revoke events are published; and
  - means for periodically publishing said IP address revoke events.

103. The apparatus of claim 102, further comprising:
- means for maintaining in said local memory information on IP addresses allocated and user identification records for said point of presence;
- means for subscribing at said protocol gateway to said IP address allocation events and said IP address revoke events; and
- means for updating contents of said local memory information on IP addresses allocated and user identification records based on said IP address allocation events and said IP address revoke events received at said protocol gateway.

104. The apparatus of claim 103, further comprising:
- means for maintaining in said controller memory information on IP addresses allocated and user identification records for said data communications network; and
- means for updating said information on IP addresses allocated and user identification records in said controller memory based on said IP address allocation events and said user accounting events subscribed to.

105. The apparatus of claim 104 wherein said AAA service obtains said authorization, authentication and accounting information from said local memory and said controller memory.

106. The apparatus of claim 102, further comprising:
- means for maintaining in said local memory an IP address database storing IP address information comprising IP addresses currently allocated to users, said IP addresses being included in said pool of IP addresses;
- means for maintaining in said local gateway memory a user record database storing user identification information for users having a home PoP ID the same as a PoP ID of said network access device; and
- means for updating the contents of said IP address database and said user record database based on said IP address allocation events and said IP address revoke events received at said protocol gateway.

107. The apparatus of claim 106, further comprising:
- means for subscribing at said protocol gateway to said accounting start events; and
- means for further updating contents of said IP address database based on said accounting start events.

108. The apparatus of claim 107, further comprising:
- means for subscribing at said protocol gateway to said accounting stop events; and means for further updating contents of said user record database based on said accounting start events and accounting stop events.

109. The apparatus of claim 107, further comprising:
means for maintaining a temporary database containing IP addresses reported by said IP address allocation events until reported by said accounting start events; and
means for moving said IP addresses from said temporary database to said IP address database when the IP addresses are reported by said accounting start events.

110. The apparatus of claim 107, further comprising means for filtering on users' home PoP IDs at said protocol gateway so as to receive events for users having a home PoP ID of said point of presence.

111. The apparatus of claim 102, further comprising:
means for maintaining in said controller memory an IP address database storing IP address information comprising IP addresses currently allocated to users;
means for maintaining in said controller memory a user record database storing user identification information; and
means for updating said IP address database and said user record database in said controller memory based on said IP address allocation events and said user accounting events subscribed to.

112. The apparatus of claim 111 wherein
said IP address information further comprises user names and respective expiry time of the IP addresses allocated to the users; and
said apparatus further comprises:
 means for periodically examining said IP address database based on a timer so as to determine if an IP address has expired;
 means for confirming on said user record database that a user to whom said expired IP address has been allocated logged out; and
 means for removing said expired and confirmed IP addresses from said IP address database to said database for IP address revoke events.

113. The apparatus of claim 111 wherein
said IP address information further comprises user names and respective expiration times of the IP addresses allocated to the users; and
said apparatus further comprises:
 means for verifying the expiration time of IP addresses on said IP address database when the IP addresses are reported by said accounting stop events subscribed to; and
 means for removing said reported and verified IP addresses from said IP address database to said database for IP address revoke events.

114. The apparatus of claim 113, further comprising means for updating contents of said user record database in said controller memory in accordance with changes in said IP address database.

115. The apparatus of claim 113, further comprising:
means for subscribing at said dynamic IP address server to at least said IP address revoke events; and
means for revoking leases of IP addresses reported by said IP address revoke events and making said IP addresses available to users by putting them back in the IP address pool.

116. The apparatus of claim 113, further comprising:
means for subscribing at a domain name system (DNS) server to at least said accounting start events and said IP address revoke events, said DNS server for maintaining associations between users' domain names and IP addresses;
means for adding entries of said associations for IP addresses reported by said accounting start events subscribed to; and
means for deleting entries of said associations for IP addresses reported by said IP address revoke events subscribed to.

117. The apparatus of claim 97, further comprising means for updating contents of said user record database in said controller memory in accordance with changes in said IP address database.

118. An IP address management system for managing dynamic IP address allocation in a data communications network having a point of presence, a network access device, an Authentication, Authorization and Accounting (AAA) server and a dynamic IP allocation server associated with said point of presence, said system comprising:
a protocol gateway configured to submit a query to said AAA server in response to an attempted log-in by a user through the network access device, said protocol gateway receiving an IP address previously assigned to said user if said user is authorized to log-in and said IP address is currently allocated to said user, said protocol gateway receiving a leased IP address from said dynamic IP allocation server if said user is authorized to log-in and an IP address is not currently allocated to said user.
a local memory in communication with the protocol gateway;
a local memory publisher, said local memory publisher periodically publishing to subscribers contents of said local memory over an information bus;
a network controller in communication with said protocol gateway over an information bus;
a controller memory associated with said network controller;
a controller memory publisher associated with said controller memory, said controller memory publisher periodically publishing to subscribers contents of said controller memory over an information bus;
a controller subscriber associated with said network controller, said controller subscriber subscribing to IP address allocation events and user accounting events published by said protocol gateway; and
an IP address revoke database maintained in said controller memory, said database containing IP address revoke events, said IP address revoke events held in said IP address revoke database until said controller memory publisher publishes contents of said controller memory over an information bus.

119. The system of claim 118, further comprising an IP address allocation database maintained in said controller memory, said IP address allocation database including entries having user identification and allocated IP address for said users for a plurality of points of presence on the data communications network.

120. The system of claim 119 wherein said IP address allocation database further includes for each entry an IP address expiration time.

121. The system of claim 120, further comprising a controller database updater associated with said network controller, said controller database updater updating said IP address allocation database in response to IP address allocation events and user accounting events received by said controller subscriber.

122. The system of claim 121, further comprising a clock, said network controller periodically examining said IP address allocation database maintained in said controller memory and said clock so as to determine if an IP address has expired, said network controller removing said expired IP address entries from said IP address database upon confirming log-out of a user to whom said expired IP address was allocated.

123. The system of claim 121 wherein
said controller subscriber receives user accounting stop events published by said protocol gateway, and
said network controller removes IP addresses from said IP address allocation database and places said IP addresses into said IP address revoke database.

124. The system of claim 123 wherein said network controller removes IP addresses from said IP address allocation database in response to the receipt by said controller subscriber of user accounting stop events corresponding to users to whom said IP addresses are allocated.

125. The system of claim 123 wherein said network controller removes IP addresses from said IP address allocation database in response to the expiration of said IP addresses.

126. The system of claim 119, further comprising a controller database updater associated with said network controller, said controller database updater updating said IP address allocation database in response to IP address allocation events and user accounting events received by said controller subscriber.

127. The system of claim 118, further comprising a dynamic IP allocation subscriber associated with said dynamic IP allocation server, said dynamic IP allocation subscriber subscribing to IP address revoke events published by said controller memory publisher over said information bus.

128. The system of claim 127, further comprising means associated with said dynamic IP allocation server for revoking leased IP addresses in response to receipt of published IP address revoke events.

129. The system of claim 118, further comprising:
a domain name system (DNS) server maintaining an association database mapping between domain names and IP addresses; and
a DNS subscriber associated with said DNS server, said DNS subscriber subscribing to IP address revoke events and accounting start events.

130. The system of claim 129 wherein said DNS server adds mappings between domain names and IP addresses to its association database in response to accounting start events received from said protocol gateway.

131. The system of claim 130 wherein said DNS server deletes mappings between domain names and IP addresses from its association database in response to IP address revoke events received from said controller memory publisher.

132. A method for managing IP addresses on a data communications network including: a network access device in a point of presence (PoP) for providing user access to the data communications network; a protocol gateway coupled to said network access device; a local memory associated with said protocol gateway; an authentication, authorization and accounting (AAA) server providing user authentication, authorization and accounting information to said protocol gateway; a dynamic IP address server maintaining a pool of IP addresses, a network controller in communication with said protocol gateway and a controller memory associated with said network controller, said method comprising:
querying said AAA server upon attempted log-in to said data communications network by a user through said network access device to determine if said user is an authorized user and if an IP address is already allocated to said user;
receiving an IP address from said AAA service if said user is authorized to access the data communications network and an IP address is already allocated to said user,
obtaining an available IP address from said pool of IP addresses if said user is authorized to access the data communications network and an IP address is not already allocated to said user;
allocating said received or obtained IP address to the user;
maintaining in said local memory a database for IP address allocation events each including an IP address allocated to a user and associated user identification information until said IP address allocation events are published;
periodically publishing said IP address allocation events;
receiving from said network access device users' log-in and log-out information;
maintaining in said local memory a database for user accounting events including users' log-in and log-off records until said user accounting events are published;
periodically publishing said user accounting events;
subscribing at said network controller to said IP address allocation events and said user accounting events published from said local memory,
producing a database for IP address revoke events including IP addresses to be revoked;
maintaining said database in said controller memory until said IP address revoke events are published; and
periodically publishing said IP address revoke events.

133. A method according to claim 132, further comprising:
maintaining in said local memory information on IP addresses allocated and user identification records for said point of presence;
subscribing at said protocol gateway to said IP address allocation events and said IP address revoke events; and
updating contents of said local memory information on IP addresses allocated and user identification records based on said IP address allocation events and said IP address revoke events received at said protocol gateway.

134. A method according to claim 133, further comprising:
maintaining in said controller memory information on IP addresses allocated and user identification records for said data communications network; and
updating said information on IP addresses allocated and user identification records in said controller memory based on said IP address allocation events and said user accounting events subscribed to.

135. A method according to claim 132, further comprising:
maintaining in said local memory an IP address database storing IP address information including IP addresses currently allocated to users, said IP addresses being included in said pool of UP addresses;
maintaining in said local gateway memory a user record database storing user identification information for users having a home PoP ID the same as a PoP ID of said network access device; and updating the contents of said IP address database and said user record database based on said IP address allocation events and said IP address revoke events received at said protocol gateway.

136. A method according to claim 135, further comprising:

subscribing at said protocol gateway to said accounting start events; and further updating contents of said IP address database based on said accounting start events.

137. A method according to claim 136, further comprising:

subscribing at said protocol gateway to said accounting stop events; and further updating contents of said user record database based on said accounting start events and accounting stop events.

138. A method according to claim 136, further comprising:

maintaining a temporary database containing IP addresses reported by said IP address allocation events until reported by said accounting start events; and moving said IP addresses from said temporary database to said IP address database when the IP addresses are reported by said accounting start events.

139. A method according to claim 136, further comprising filtering on users' home PoP IDs at said protocol gateway so as to receive events for users having a home PoP ID of said point of presence.

140. A method according to claim 132, further comprising:

maintaining in said controller memory an IP address database storing IP address information including IP addresses currently allocated to users;

maintaining in said controller memory a user record database storing user identification information; and updating said IP address database and said user record database in said controller memory based on said IP address allocation events and said user accounting events subscribed to.

141. A method according to claim 140 wherein said IP address information further includes user names and respective expiry time of the IP addresses allocated to the users, said method further comprising:

periodically examining said IP address database based on a timer so as to determine if an IP address has expired;

confirming on said user record database that a user to whom said expired IP address has been allocated logged out; and removing said expired and confirmed IP addresses from said IP address database to said database for IP address revoke events.

142. A method according to claim 140 wherein said IP address information further includes user names and respective expiration times of the IP addresses allocated to the users, said method further comprising:

verifying the expiration time of IP addresses on said IP address database when the IP addresses are reported by said accounting stop events subscribed to; and removing said reported and verified IP addresses from said IP address database to said database for IP address revoke events.

143. A method according to claim 142, further comprising updating contents of said user record database in said controller memory in accordance with changes in said IP address database.

144. A method according to claim 132, further comprising:

subscribing at said dynamic IP address server to at least said IP address revoke events; and revoking leases of IP addresses reported by said IP address revoke events and making said IP addresses available to users by putting them back in the IP address pool.

145. A method according to claim 132, said data communications network further including a domain name system (DNS) server for maintaining associations between users' domain names and IP addresses, said method further comprising:

subscribing at said DNS to at least said accounting start events and said IP address revoke events; and adding entries of said associations for IP addresses reported by said accounting start events subscribed to; and deleting entries of said associations for IP addresses reported by said IP address revoke events subscribed to.

* * * * *